(12) United States Patent
Ono et al.

(10) Patent No.: US 11,246,351 B2
(45) Date of Patent: Feb. 15, 2022

(54) POWER SUPPLY UNIT FOR AEROSOL GENERATION DEVICE

(71) Applicant: Japan Tobacco Inc., Tokyo (JP)

(72) Inventors: Yasuhiro Ono, Tokyo (JP); Minoru Kitahara, Tokyo (JP); Shujiro Tanaka, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 0 days.

(21) Appl. No.: 17/369,976

(22) Filed: Jul. 8, 2021

(65) Prior Publication Data

US 2022/0007726 A1 Jan. 13, 2022

(30) Foreign Application Priority Data

Jul. 9, 2020 (JP) .............................. JP2020-118742

(51) Int. Cl.
*A24F 40/50* (2020.01)
*A24F 40/46* (2020.01)

(52) U.S. Cl.
CPC .............. *A24F 40/50* (2020.01); *A24F 40/46* (2020.01)

(58) Field of Classification Search
None
See application file for complete search history.

(56) References Cited

U.S. PATENT DOCUMENTS

| | | |
|---|---|---|
| 2020/0229502 A1 | 7/2020 | Akao |
| 2020/0229503 A1 | 7/2020 | Akao |
| 2020/0229504 A1 | 7/2020 | Akao |
| 2020/0229505 A1 | 7/2020 | Akao |
| 2020/0233444 A1 | 7/2020 | Akao |
| 2020/0235599 A1 | 7/2020 | Akao |
| 2020/0235600 A1 | 7/2020 | Akao |
| 2021/0127746 A1* | 5/2021 | Tatsuta ................... A24F 40/40 |

FOREIGN PATENT DOCUMENTS

| | | |
|---|---|---|
| CA | 3 068 708 A1 | 4/2020 |
| CN | 104348214 A | 2/2015 |
| CN | 205355787 U | 6/2016 |
| CN | 206865186 U | 1/2018 |
| CN | 209090055 U | 7/2019 |
| CN | 110946336 A | 4/2020 |

(Continued)

OTHER PUBLICATIONS

Notice of Reasons for Refusal received for Japanese Patent Application No. 2020-118742, dated Oct. 20, 2020, 5 pages including English Translation.

(Continued)

*Primary Examiner* — James Harvey
(74) *Attorney, Agent, or Firm* — Xsensus LLP

(57) ABSTRACT

A power supply unit for an aerosol generation device includes: a power supply configured to supply power to a heater configured to heat an aerosol source; a first connector connected to a first load configured to function by power supplied from the power supply; a second connector configured to function by power supplied from the power supply and connected to a second load separate from the first load; a Zener diode connected between the first connector and the power supply; and a variable resistor connected between the second connector and the power supply.

20 Claims, 6 Drawing Sheets

(56) References Cited

FOREIGN PATENT DOCUMENTS

| JP | 2018-064357 A | 4/2018 |
|---|---|---|
| JP | 6633788 B1 | 1/2020 |
| WO | 2017/072705 A2 | 5/2017 |

OTHER PUBLICATIONS

Decision to Grant a Patent received for Japanese Patent Application No. 2020-118742, dated Mar. 2, 2021, 5 pages including English Translation.
European Search Report dated Nov. 19, 2021 in European Application No. 21184489.9.
European Communication pursuant to Article 94(3) dated Dec. 15, 2021, in corresponding European Patent Application No. 21 184 489.9.

* cited by examiner

FIG. 6

| | LOAD | | | | |
|---|---|---|---|---|---|
| | VIBRATOR | DISPLAY | FIRST CARTRIDGE | LED | INTAKE SENSOR |
| EXPOSED TO OUTSIDE | NOT EXPOSED | EXPOSED | NOT EXPOSED | NOT EXPOSED | NOT EXPOSED |
| CONNECTION TO MAIN BODY | PROVIDED | PROVIDED | ATTACHABLE AND DETACHABLE | PROVIDED | PROVIDED |
| PRESENCE OR ABSENCE OF POSSIBILITY OF BECOMING NOISE SOURCE | PRESENCE | ABSENCE | ABSENCE | ABSENCE | ABSENCE |
| TYPE OF NOISE | COUNTER-ELECTROMOTIVE FORCE | STATIC ELECTRICITY | STATIC ELECTRICITY | — | — |
| OVERVOLTAGE PROTECTION ELEMENT | ZENER DIODE | VARIABLE RESISTOR | VARIABLE RESISTOR | — | — |

POWER SUPPLY UNIT FOR AEROSOL GENERATION DEVICE

CROSS-REFERENCE TO RELATED APPLICATION

This application is based upon and claims the benefit of priority from prior Japanese patent application No. 2020-118742, filed on Jul. 9, 2020, the entire contents of which are incorporated herein by reference.

TECHNICAL FIELD

The present invention relates to a power supply unit for an aerosol generation device.

BACKGROUND ART

Patent Literature 1 discloses a power supply unit including a Zener diode connected in parallel to a control device between the control device and a connector that can be electrically connected to an external power supply in order to protect the control device of the power supply unit for an aerosol inhaler. Further, Patent Literatures 2 and 3 disclose a power supply unit including a Zener diode connected in parallel to a charger between a connector and the charger in order to stabilize a voltage input to the charger.
Patent Literature 1: Japanese Patent No. 6633788
Patent Literature 2: CN 206865186 U
Patent Literature 3: CN 104348214 A In recent years, functionality of the aerosol generation device has been increased, and accordingly, a load of the power supply unit for the aerosol generation device also tends to increase. Here, the load is an electronic component that functions (that is, operates) by supplying power. An unintended overvoltage or the like may be applied to such a load due to any factor such as static electricity, and/or may occur. Therefore, by providing a predetermined protection element for such a load, it is necessary to protect the power supply unit from the overvoltage that may be applied to the load and/or that may be generated. In the related art, there is room for improvement from a viewpoint of appropriately protecting the power supply unit for the aerosol generation device including a plurality of loads.

SUMMARY OF INVENTION

The present invention provides a power supply unit for an aerosol generation device that can appropriately protect the power supply unit for the aerosol generation device including a plurality of loads.

According to an aspect of the present invention, there is provided a power supply unit for an aerosol generation device including: a power supply configured to supply power to a heater configured to heat an aerosol source; a first connector connected to a first load configured to function by power supplied from the power supply; a second connector configured to function by power supplied from the power supply and connected to a second load separate from the first load; a Zener diode connected between the first connector and the power supply; and a variable resistor connected between the second connector and the power supply.

According to the present invention, it is possible to appropriately protect a power supply unit for an aerosol generation device including a plurality of loads.

BRIEF DESCRIPTION OF DRAWINGS

FIG. 6 is a table showing protection elements according to characteristics of loads provided in the aerosol inhaler of FIG. 1.

DESCRIPTION OF EMBODIMENTS

Hereinafter, a power supply unit for an aerosol generation device according to an embodiment of the present invention will be described. First, an aerosol inhaler, which is an example of the aerosol generation device including the power supply unit of the present embodiment, will be described with reference to FIGS. 1 to 3.

(Aerosol Inhaler)

An aerosol inhaler 1 is an instrument for generating an aerosol to which a flavor is added without burning and sucking the generated aerosol, preferably has a size that fits in a hand, and has a substantially rectangular parallelepiped shape. The aerosol inhaler 1 may have an ovoid shape, an elliptical shape, or the like. In the following description, regarding the aerosol inhaler having the substantially rectangular parallelepiped shape, three orthogonal directions will be referred to as an upper-lower direction, a front-rear direction, and a left-right direction in descending order of length. Further, in the following description, for convenience, as shown in FIGS. 1 to 3, a front side, a rear side, a left side, a right side, an upper side, and a lower side are defined, and the front side is shown as Fr, the rear side is shown as Rr, the left side is shown as L, the right side is shown as R, the upper side is shown as U, and the lower side is shown as D.

Figure 1:
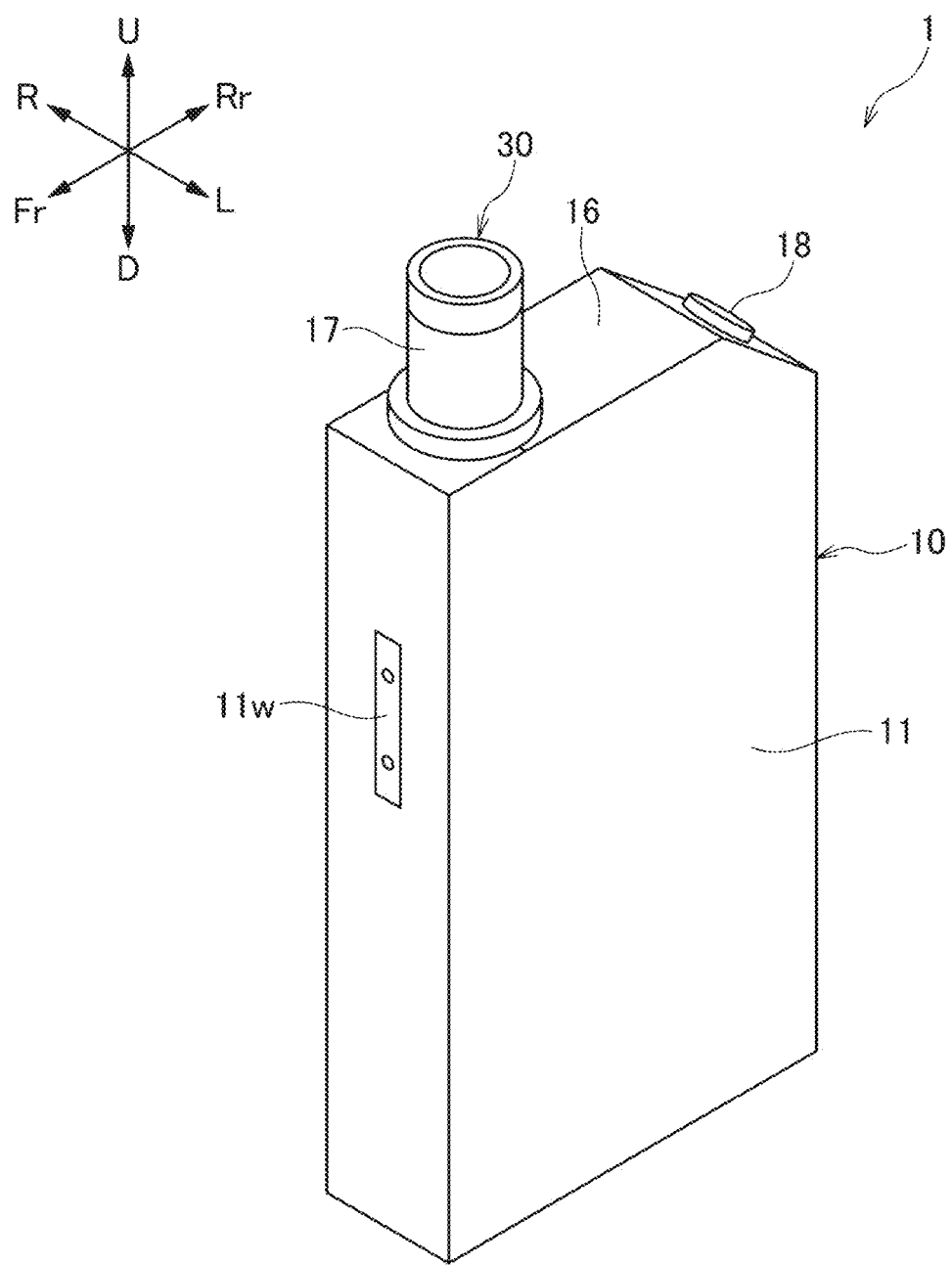
FIG. 1 is a perspective view of an aerosol inhaler according to an embodiment of the present invention.
Figure 2:
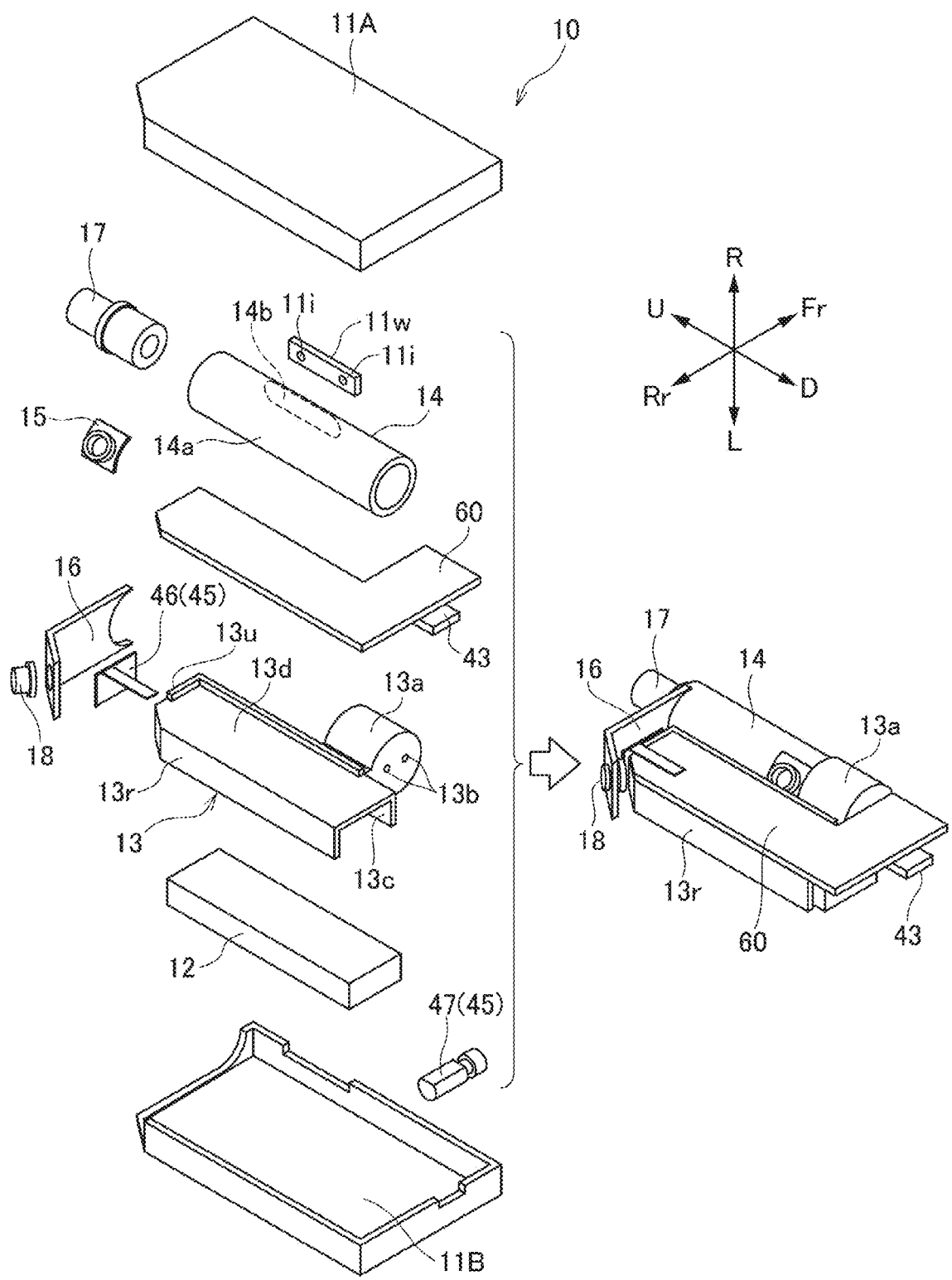
FIG. 2 is an exploded perspective view of the aerosol inhaler of FIG. 1.
Figure 3:
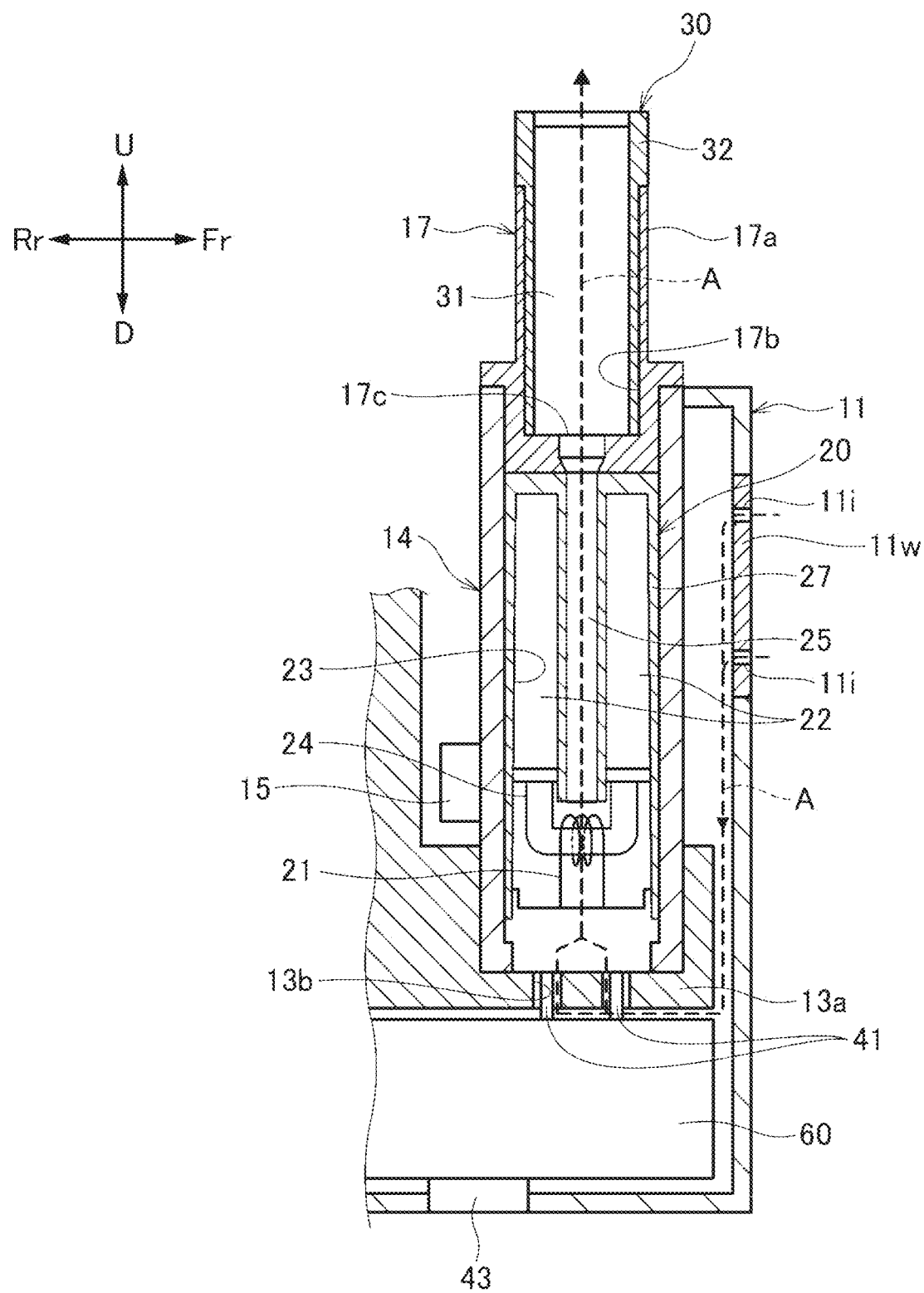
FIG. 3 is a cross-sectional view of the aerosol inhaler of FIG. 1.

As shown in FIGS. 1 to 3, the aerosol inhaler 1 includes a power supply unit 10, a first cartridge 20, and a second cartridge 30. The first cartridge 20 and the second cartridge 30 are attachable to and detachable from the power supply unit 10. In other words, the first cartridge 20 and the second cartridge 30 are replaceable.

(Power Supply Unit)

As shown in FIGS. 1 and 2, the power supply unit 10 houses various sensors and the like such as a power supply 12, an internal holder 13, a circuit board 60, and an intake sensor 15 inside a power supply unit case 11 having a substantially rectangular parallelepiped shape (hereinafter, also referred to as an inside of the case). The power supply 12, the circuit board 60 (including an MCU 50, a discharging terminal 41, a charging terminal 43, and the like, which will be described later), and the like are collectively housed in the power supply unit case 11, so that carrying by a user can be facilitated and user convenience can be improved.

The power supply unit case 11 is configured with a first case 11A and a second case 11B that are attachable and detachable in the left-right direction (thickness direction), and the first case 11A and the second case 11B are assembled in the left-right direction (thickness direction), so that a front surface, a rear surface, a left surface, a right surface, and a lower surface of the power supply unit 10 are formed. An upper surface of the power supply unit 10 is formed by a display 16.

A mouthpiece 17 is provided in the upper surface of the power supply unit 10 in front of the display 16. In the mouthpiece 17, a suction port 17a protrudes further upward than the display 16.

An inclined surface inclined downward toward the rear side is provided between the upper surface and the rear surface of the power supply unit 10. An operation unit 18 that can be operated by the user is provided on the inclined surface. The operation unit 18 is configured with a button-type switch, a touch panel, and the like, and is used when activating or interrupting the MCU 50 and various sensors by reflecting a use intention of the user, or the like.

On a lower surface of the power supply unit 10, the charging terminal 43 that can be electrically connected to an external power supply (not shown) that can charge the power supply 12 is provided. The charging terminal 43 is, for example, a receptacle into which a mating plug (not shown) can be inserted. As the charging terminal 43, a receptacle into which various USB terminals (plugs) or the like can be inserted can be used. As an example, in the present embodiment, the charging terminal 43 is a USB Type-C shaped receptacle. Accordingly, it is possible to facilitate charging of the power supply unit 10 (that is, the aerosol inhaler 1) at various locations (places) and secure an opportunity capable of charging the power supply unit 10.

The charging terminal 43 may include, for example, a power reception coil, and may be configured to be able to receive power transmitted from the external power supply in a non-contact manner. A wireless power transfer method in this case may be an electromagnetic induction type, a magnetic resonance type, or a combination of the electromagnetic induction type and the magnetic resonance type. As another example, the charging terminal 43 can be connected to various USB terminals or the like and may include the power reception coil described above.

The internal holder 13 includes a rear wall 13r that extends along the rear surface of the power supply unit 10, a central wall 13c that is provided at a central portion in the front-rear direction inside the case and extends parallel to the rear wall13r, an upper wall 13u that extends along the display 16 and couples the rear wall 13r to the central wall 13c, a partition wall 13d that is orthogonal to the rear wall 13r, the central wall 13c, and the upper wall 13u and divides a space partitioned and formed by the rear wall 13r, the central wall 13c, and the upper wall 13u into a left side space and a right side space, and a cartridge holding portion 13a coupled to the central wall 13c and positioned in front of the central wall 13c and above the lower surface of the power supply unit 10.

The power supply 12 is disposed in the left side space of the internal holder 13. The power supply 12 is a rechargeable secondary battery, an electric double-layer capacitor, or the like, and is preferably a lithium-ion secondary battery. An electrolyte of the power supply 12 may be one of or a combination of a gel-like electrolyte, an electrolytic solution, a solid electrolyte, and an ionic liquid.

The L-shaped circuit board 60 is disposed in a space formed by a right side space of the internal holder 13 and a lower side space formed between the cartridge holding portion 13a and the lower surface of the power supply unit 10. The circuit board 60 is configured by stacking a plurality of layers (four layers in the present embodiment) of boards, and electronic components (elements) such as the micro controller unit (MCU) 50 and a charging IC 55, which will be described later, are mounted on the circuit board 60.

Although details will be described later with reference to FIG. 5 and the like, the MCU 50 is a control device (a controller) that is connected to various sensor devices such as the intake sensor 15 that detects a puff (intake) operation, the operation unit 18, a notification unit 45, a memory 19 that stores number of times of puff operations, an energization time to the load 21, or the like, and the like, and that performs various controls of the aerosol inhaler 1. Specifically, the MCU 50 is mainly configured with a processor, and further includes a storage medium such as a random access memory (RAM) required for an operation of the processor and a read only memory (ROM) that stores various pieces of information. The processor in the present description is, for example, an electric circuit in which circuit elements such as semiconductor elements are combined. Some of the elements (for example, the intake sensor 15 and the memory 19) connected to the MCU 50 in FIG. 5 may be provided inside the MCU 50 as a function of the MCU 50 itself.

The charging IC 55 is an integrated circuit (IC) that controls charging of the power supply 12 by power input from the charging terminal 43 and that supplies power of the power supply 12 to the electronic components and the like of the circuit board 60.

A cylindrical cartridge holder 14 that holds the first cartridge 20 is disposed at the cartridge holding portion 13a.

A through hole 13b, which receives the discharging terminal 41 (see FIG. 3) provided so as to protrude from the circuit board 60 toward the first cartridge 20, is provided in a lower end portion of the cartridge holding portion 13a. The discharging terminal 41 is a connector that electrically connects the load 21 provided in the first cartridge 20. Further, the discharging terminal 41 is a connector that removably (or easily removably) connects the load 21, and is configured with, for example, a pin or the like in which a spring is built. The discharging terminal 41 is an example of a second connector in the present invention.

The through hole 13b is larger than the discharging terminal 41, and is configured such that air flows into an inside of the first cartridge 20 via a gap formed between the through hole 13b and the discharging terminal 41.

The intake sensor 15 that detects a puff operation is provided on an outer peripheral surface 14a of the cartridge holder 14 at a position facing the circuit board 60. The intake sensor 15 may be configured with a condenser microphone, a pressure sensor, or the like. Further, the cartridge holder 14 is provided with a hole portion 14b that is long in the upper-lower direction and through which a remaining amount of the aerosol source 22 stored inside the first cartridge 20 can be visually checked, and is configured such that the user can visually check the remaining amount of the aerosol source 22 stored inside the first cartridge 20 through the hole portion 14b of the first cartridge 20 from a remaining amount check window 11w that has light-transmissive properties and is provided in the power supply unit case 11.

As shown in FIG. 3, the mouthpiece 17 is detachably fixed to an upper end portion of the cartridge holder 14. The second cartridge 30 is detachably fixed to the mouthpiece 17. The mouthpiece 17 includes a cartridge housing portion 17b that houses a part of the second cartridge 30, and a communication path 17c that allows the first cartridge 20 and the cartridge housing portion 17b to communicate with each other.

The power supply unit case 11 is provided with air intake ports 11i that take in outside air inside. The air intake port 11i is provided in, for example, the remaining amount check window 11w.

(First Cartridge)

As shown in FIG. 3, the first cartridge 20 includes, inside a cylindrical cartridge case 27, a reservoir 23 that stores the aerosol source 22, an electrical load 21 that atomizes the aerosol source 22, a wick 24 that draws the aerosol source from the reservoir 23 to the load 21, and an aerosol flow path 25 through which an aerosol generated by atomizing the aerosol source 22 flows toward the second cartridge 30.

The reservoir 23 is partitioned and formed so as to surround a periphery of the aerosol flow path 25, and stores the aerosol source 22. The reservoir 23 may house a porous body such as a resin web or cotton, and the aerosol source 22 may be impregnated with the porous body. The reservoir 23 may store only the aerosol source 22 without housing the porous body on the resin web or the cotton. The aerosol source 22 contains a liquid such as glycerin, propylene glycol, or water.

The wick 24 is a liquid holding member that draws the aerosol source 22 from the reservoir 23 to the load 21 by using a capillary phenomenon. The wick 24 is made of, for example, glass fiber, porous ceramic, or the like.

The load 21 is a heat generation element (that is, a heater) that heats the aerosol source 22 without burning by power supplied from the power supply 12 via the discharging terminal 41, and is configured with, for example, an electric heating wire (a coil) wound at a predetermined pitch. The load 21 heats the aerosol source 22 to atomize the aerosol source 22. As the load 21, a heat generation resistor, a ceramic heater, an induction heating type heater, or the like can be used. The load 21 is an example of a heater and a second load in the present invention.

The aerosol flow path 25 is provided on a downstream side of the load 21 and on a center line of the first cartridge 20.

(Second Cartridge)

The second cartridge 30 stores a flavor source 31. The second cartridge 30 is detachably housed in the cartridge housing portion 17b provided in the mouthpiece 17.

The second cartridge 30 adds a flavor to an aerosol by passing the aerosol generated by atomizing the aerosol source 22 by the load 21 through the flavor source 31. As a raw material piece that constitutes the flavor source 31, chopped tobacco or a molded body obtained by molding a tobacco raw material into a granular shape can be used. The flavor source 31 may be formed of a plant other than the tobacco (for example, mint, Chinese herb or herb). A fragrance such as menthol may be added to the flavor source 31.

The aerosol inhaler 1 can generate (that is, produce) an aerosol to which a flavor is added by the aerosol source 22, the flavor source 31, and the load 21. That is, the aerosol source 22 and the flavor source 31 constitute an aerosol generation source that generates the aerosol to which the flavor is added.

The configuration of the aerosol generation source used for the aerosol inhaler 1 may be a configuration in which the aerosol source 22 and the flavor source 31 are integrally formed, a configuration in which the flavor source 31 is omitted and a substance that can be contained in the flavor source 31 is added to the aerosol source 22, a configuration in which a medicine or the like instead of the flavor source 31 is added to the aerosol source 22, or the like, in addition to the configuration in which the aerosol source 22 and the flavor source 31 are formed separately.

In the aerosol inhaler 1 configured as described above, as indicated by an arrow A in FIG. 3, air that flows in from the air intake ports 11i provided in the power supply unit case 11 passes through a vicinity of the load 21 of the first cartridge 20 via the gap formed between the through hole 13b and the discharging terminal 41. The load 21 atomizes the aerosol source 22 drawn from the reservoir 23 by the wick 24. The aerosol generated by atomization flows through the aerosol flow path 25 together with the air that flows in from the intake ports, and is supplied to the second cartridge 30 via the communication path 17c. The aerosol supplied to the second cartridge 30 is flavored by passing through the flavor source 31, and is supplied to a suction port 32.

Figure 5:
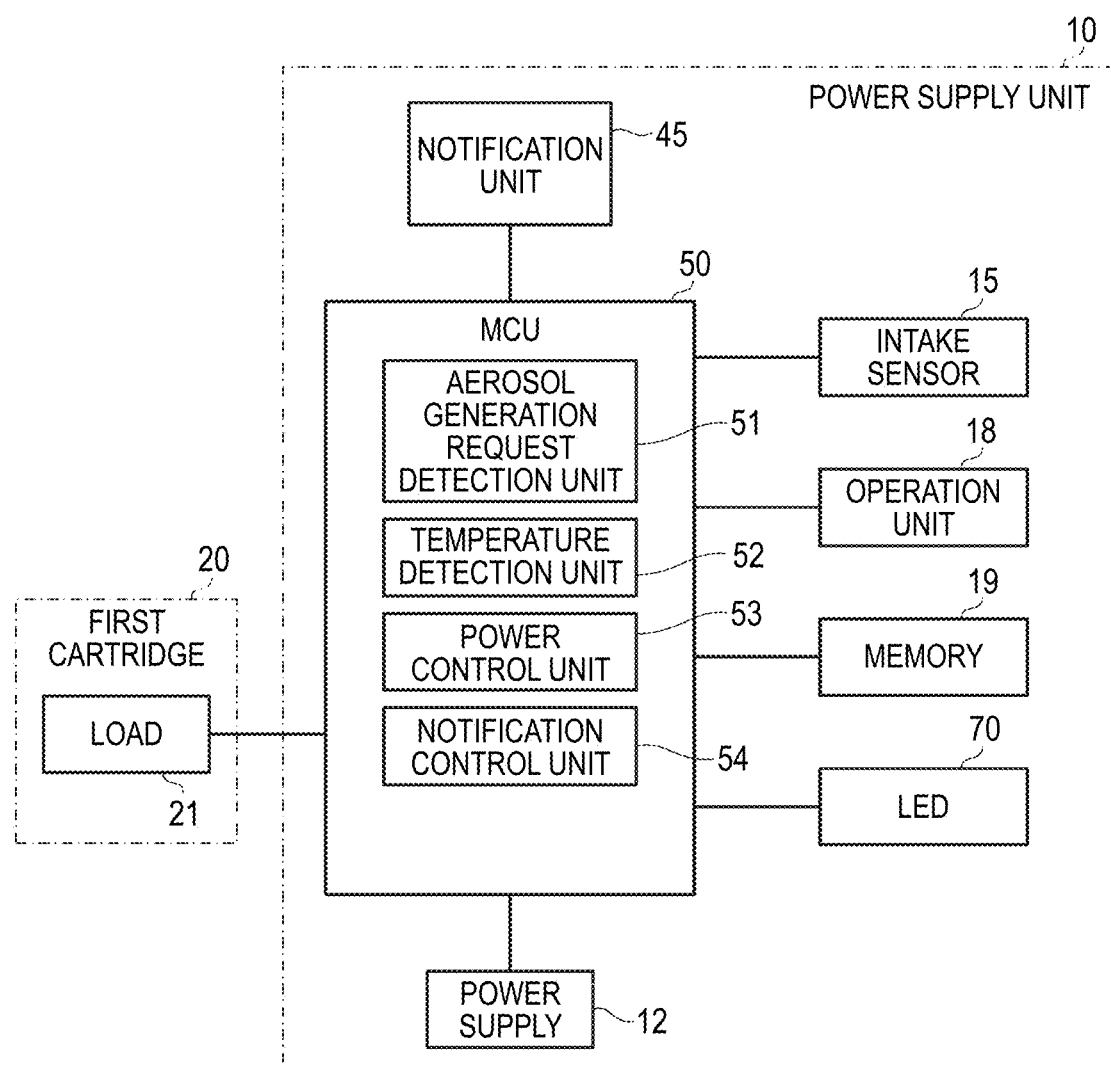
FIG. 5 is a block diagram showing a configuration of an MCU of the power supply unit in the aerosol inhaler of FIG. 1.

The aerosol inhaler 1 is provided with the notification unit 45 that notifies various pieces of information (see FIG. 5). The notification unit 45 may be configured with a light-emitting element, a vibration element, or a sound output element. Further, the notification unit 45 may be a combination of two or more elements among the light-emitting element, the vibration element, and the sound output element. The notification unit 45 may be provided in any one of the power supply unit 10, the first cartridge 20, and the second cartridge 30, but is preferably provided in the power supply unit 10 that is not a consumable item.

In the present embodiment, an organic light emitting diode (OLED) panel 46 and a vibrator 47 are provided as the notification unit 45. When an OLED of the OLED panel 46 emits light, various pieces of information on the aerosol inhaler 1 are notified to the user via the display 16. Further, the vibrator 47 vibrates, so that the user is notified of the various pieces of information on the aerosol inhaler 1 via the power supply unit case 11. The notification unit 45 may be provided with only one of the OLED panel 46 and the vibrator 47, or may be provided with another light-emitting element or the like. Further, information notified by the OLED panel 46 and information notified by the vibrator 47 may be different or the same.

(Electric Circuit)

Next, an electric circuit of the power supply unit 10 will be described with reference to FIG. 4.

Figure 4:
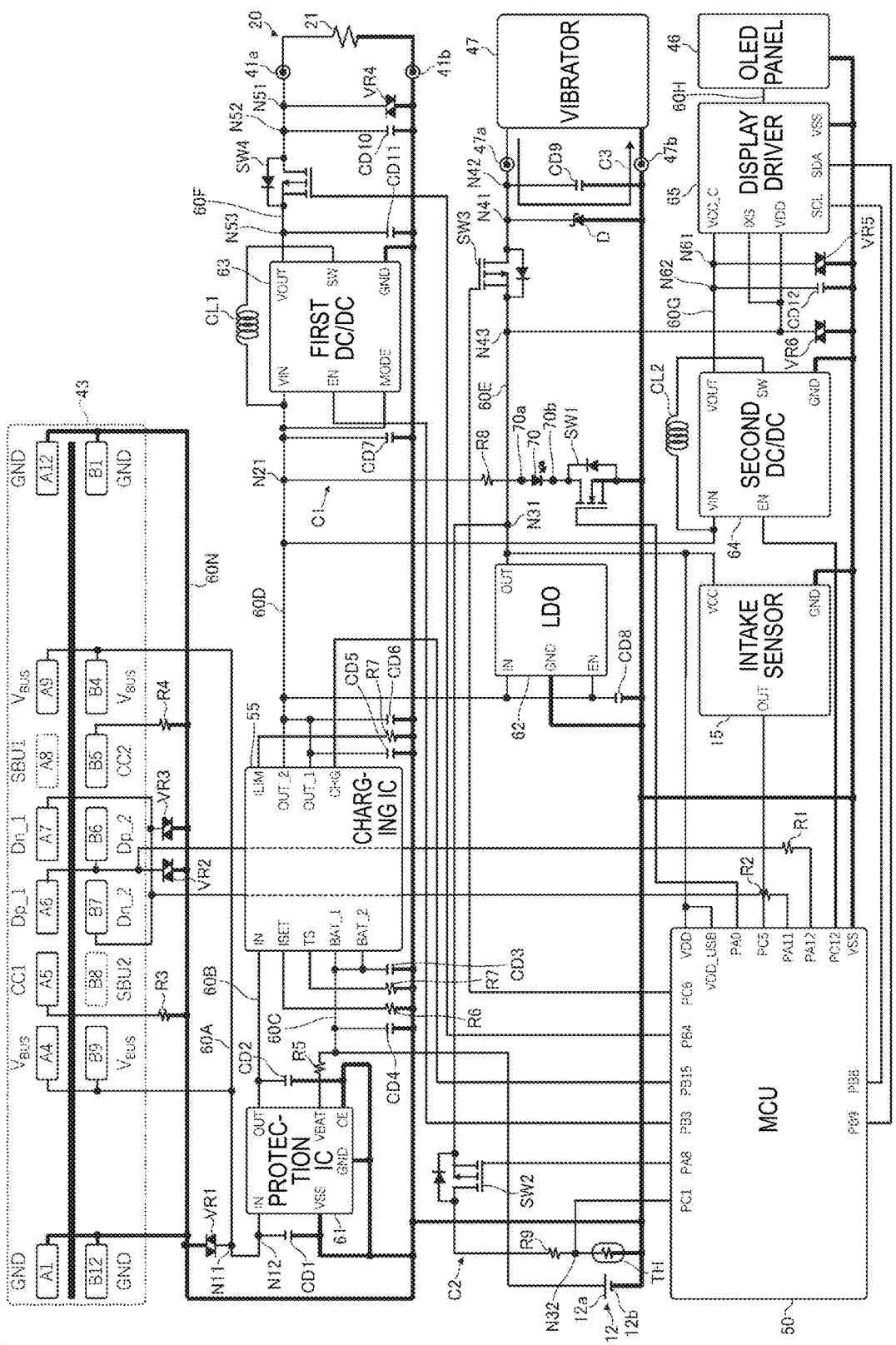
FIG. 4 is a diagram showing a circuit configuration of a power supply unit of the aerosol inhaler of FIG. 1.

As shown in FIG. 4, the power supply unit 10 includes, as main components, the power supply 12, the charging terminal 43, the MCU 50, the charging IC 55, a protection IC 61, an LDO regulator (indicated by "LDO" in FIG. 4) 62, a first DC/DC converter (indicated by "first DC/DC" in FIG. 4) 63, a second DC/DC converter (indicated by "second DC/DC" in FIG. 4) 64, a display driver 65, the intake sensor 15, the OLED panel 46, and the vibrator 47.

The charging terminal 43 is the receptacle into which the mating plug can be inserted as described above, and includes a plurality of pins (terminals) electrically connected to a pin of the inserted plug. Specifically, the charging terminal 43 includes an A1 pin (indicated by "A1" in FIG. 4), an A4 pin (indicated by "A4" in FIG. 4), an A5 pin (indicated by "A5" in FIG. 4), an A6 pin (indicated by "A6" in FIG. 4), an A7 pin (indicated by "A7" in FIG. 4), an A8 pin (indicated by "A8" in FIG. 4), an A9 pin (indicated by "A9" in FIG. 4), an A12 pin (indicated by "A12" in FIG. 4), a B1 pin (indicated by "B1" in FIG. 4), a B4 pin (indicated by "B4" in FIG. 4), a B5 pin (indicated by "B5" in FIG. 4), a B6 pin (indicated by "B6" in FIG. 4), a B7 pin (indicated by "B7" in FIG. 4), a B8 pin (indicated by "B8" in FIG. 4), a B9 pin (indicated by "B9" in FIG. 4), and a B12 pin (indicated by "B12" in FIG. 4).

The A1 pin, the A4 pin, the A5 pin, the A6 pin, the A7 pin, the A8 pin, the A9 pin, the A12 pin, the B1 pin, the B4 pin, the B5 pin, the B6 pin, the B7 pin, the B8 pin, the B9 pin, and the B12 pin are arranged so as to be point-symmetrical, with a center of a fitting surface with a plug of the charging terminal 43 as a point of symmetry. Accordingly, the plug can be inserted into the charging terminal 43 regardless of an upper-lower direction of the plug, and user convenience is improved.

It should be noted that, in the present embodiment, only main pins among pins provided in the charging terminal 43 are described. Further, in the present embodiment, the charging terminal 43 is provided with the A8 pin and the B8 pin, but as will be described later, these pins are not used and may be omitted.

The protection IC 61 is an IC having a function of converting a voltage input via the charging terminal 43 into a predetermined voltage as necessary and outputting the converted voltage. Specifically, the protection IC 61 converts the input voltage into a voltage included in a range from a minimum value to a maximum value of a recommended input voltage of the charging IC 55. Accordingly, even when a high voltage that exceeds the maximum value of the recommended input voltage of the charging IC 55 is input via the charging terminal 43, the protection IC 61 can protect the charging IC 55 from the high voltage.

As an example, in the present embodiment, the recommended input voltage of the charging IC 55 has a minimum value of 4.35 [V] and a maximum value of 6.4 [V]. Therefore, the protection IC 61 converts the input voltage into 5.5±0.2 [V], and outputs the converted voltage to the charging IC 55. Accordingly, the protection IC 61 can supply an appropriate voltage to the charging IC 55. Further, when the above-described high voltage is input via the charging terminal 43, the protection IC 61 may protect the charging IC 55 by opening a circuit that connects an input terminal (denoted by IN in FIG. 4) and an output terminal (denoted by OUT in FIG. 4) of the protection IC 61. In addition, the protection IC 61 may also have various protection functions (for example, an overcurrent detection function and an overvoltage detection function) for protecting the electric circuit of the power supply unit 10.

It is preferable that the protection IC 61 is connected between the charging terminal 43 and the charging IC 55, that is, is electrically provided between the charging terminal 43 and the charging IC 55. The protection IC 61 is connected between the charging terminal 43 and the charging IC 55, so that the power supply 12 can be discharged via the charging IC 55 without passing through the protection IC 61, and power loss due to passing through the protection IC 61 can be reduced.

The protection IC 61 includes a plurality of pins (terminals) for electrically connecting an inside and an outside of the protection IC 61. Specifically, the protection IC 61 includes an IN pin (indicated by "IN" in FIG. 4), a VSS pin (indicated by "VSS" in FIG. 4), a GND pin (indicated by "GND" in FIG. 4), an OUT pin (indicated by "OUT" in FIG. 4), a VBAT pin (indicated by "VBAT" in FIG. 4), and a CE pin (indicated by "CE" in FIG. 4).

In the protection IC 61, the IN pin is a pin to which power supplied from the charging terminal 43 is input. The VSS pin is a pin to which power for operating the protection IC 61 is input. The GND pin is a grounded pin. The OUT pin is a pin that outputs power to the charging IC 55. The VBAT pin is a pin for the protection IC 61 to detect a state of the power supply 12. The CE pin is a pin for switching the protection function of the protection IC 61 on/off. A connection relationship of these pins will be described later. It should be noted that, in the present embodiment, only main pins among pins provided in the protection IC 61 are described.

The charging IC 55 is an IC having a function of controlling charging to the power supply 12 and a function of supplying the power of the power supply 12 to the LDO regulator 62, the first DC/DC converter 63, the second DC/DC converter 64, and the like. For example, when supplying the power of the power supply 12, the charging IC 55 outputs a standard system voltage corresponding to an output of the power supply 12 at that time to the LDO regulator 62, the first DC/DC converter 63, the second DC/DC converter 64, and the like. Here, the standard system voltage is a voltage higher than a low-voltage system voltage described later and lower than a first high-voltage system voltage and a second high-voltage system voltage. The standard system voltage is, for example, an output voltage of the power supply 12 itself, and can be a voltage of about 3 to 4 [V].

The charging IC 55 also has a power-path function of supplying power input via the charging terminal 43 to the LDO regulator 62, the first DC/DC converter 63, the second DC/DC converter 64, and the like.

When the power-path function is used, even when the power supply 12 is being charged, power input via the charging terminal 43 can be supplied to a system of the power supply unit 10, such as the LDO regulator 62, the first DC/DC converter 63, and the second DC/DC converter 64. Therefore, when the system of the power supply unit 10 is used while charging the power supply 12, the system of the power supply unit 10 can be used while reducing a burden on the power supply 12 (that is, preventing deterioration of the power supply 12). At the same time, it is also possible to improve a charging speed of the power supply 12 and shorten a charging time. Further, when the power-path function is used, even when the power supply 12 is overdischarged, it is possible to recover the system of the power supply unit 10 by using power input via the charging terminal 43.

The charging IC 55 includes a plurality of pins (terminals) for electrically connecting an inside and an outside of the charging IC 55. Specifically, the charging IC 55 includes an IN pin (indicated by "IN" in FIG. 4), a BAT_1 pin (indicated by "BAT_1" in FIG. 4), a BAT_2 pin (indicated by "BAT_2" in FIG. 4), an ISET pin (indicated by "ISET" in FIG. 4), a TS pin (indicated by "TS" in FIG. 4), an OUT_1 pin (indicated by "OUT_1" in FIG. 4), an OUT_2 pin (indicated by "OUT_2" in FIG. 4), an ILIM pin (indicated by "ILIM" in FIG. 4), and a CHG pin (indicated by "CHG" in FIG. 4).

It should be noted that, in the present embodiment, only main pins among pins provided in the charging IC 55 are described. Further, in the present embodiment, the charging IC 55 is provided with the BAT_1 pin and the BAT_2 pin, but the BAT_1 pin and the BAT 2 pin may be combined as one pin. Similarly, in the present embodiment, the charging IC 55 is provided with the OUT_1 pin and the OUT_2 pin, but the OUT_1 pin and the OUT_2 pin may be combined as one pin.

The LDO regulator 62 is an IC having a function of generating a low-voltage system voltage from an input standard system voltage and outputting the generated low-voltage system voltage. Here, the low-voltage system voltage is a voltage lower than the standard system voltage as described above, and is, for example, a voltage suitable for operating the MCU 50, the intake sensor 15, and the like. An example of the low-voltage system voltage is 2.5 [V].

The LDO regulator 62 includes a plurality of pins (terminals) for electrically connecting an inside and an outside of the LDO regulator 62. Specifically, the LDO regulator 62 includes an IN pin (indicated by "IN" in FIG. 4), a GND pin (indicated by "GND" in FIG. 4), an OUT pin (indicated by "OUT" in FIG. 4), and an EN pin (indicated by "EN" in FIG.

4). It should be noted that, in the present embodiment, only main pins among pins provided in the LDO regulator 62 are described.

The MCU 50 operates using the input low-voltage system voltage as a power supply, and performs various controls of the aerosol inhaler 1. For example, the MCU 50 can control heating of the load 21 by controlling on/off of a switch SW4 described later and provided in the electric circuit of the power supply unit 10 and an operation of the first DC/DC converter 63. Further, the MCU 50 can control a display of the display 16 by controlling an operation of the display driver 65. Furthermore, the MCU 50 can control vibration of the vibrator 47 by controlling on/off of a switch SW3 described later and provided in the electric circuit of the power supply unit 10.

The MCU 50 includes a plurality of pins (terminals) for electrically connecting an inside and an outside of the MCU 50. Specifically, the MCU 50 includes a VDD pin (indicated by "VDD" in FIG. 4), a VDD_USB pin (indicated by "VDD_USB" in FIG. 4), a VSS pin (indicated by "VSS" in FIG. 4), a PC1 pin (indicated by "PC1" in FIG. 4), a PA8 pin (indicated by "PA8" in FIG. 4), a PB3 pin (indicated by "PB3" in FIG. 4), a PB15 pin (indicated by "PB15" in FIG. 4), a PB4 pin (indicated by "PB4" in FIG. 4), a PC6 pin (indicated by "PC6" in FIG. 4), a PA0 pin (indicated by "PA0" in FIG. 4), a PC5 pin (indicated by "PC5" in FIG. 4), a PA11 pin (indicated by "PA11" in FIG. 4), a PA12 pin (indicated by "PA12" in FIG. 4), a PC12 pin (indicated by "PC12" in FIG. 4), a PB8 pin (indicated by "PB8" in FIG. 4), and a PB9 pin (indicated by "PB9" in FIG. 4).

It should be noted that, in the present embodiment, only main pins among pins provided in the MCU 50 are described. Further, in the present embodiment, the MCU 50 is provided with the VDD pin and the VDD_USB pin, but the VDD pin and the VDD_USB pin may be combined as one pin.

The intake sensor 15 is a sensor device that detects a puff operation as described above, and is, for example, a sensor device configured to output a signal indicating a value of a change in a pressure (an internal pressure) in the power supply unit 10 caused by suction of the user through the suction port 32 as a detection result as will be described later.

The intake sensor 15 includes a plurality of pins (terminals) for electrically connecting an inside and an outside of the intake sensor 15. Specifically, the intake sensor 15 includes a VCC pin (indicated by "VCC" in FIG. 4), a GND pin (indicated by "GND" in FIG. 4), and an OUT pin (indicated by "OUT" in FIG. 4). It should be noted that, in the present embodiment, only main pins among pins provided in the intake sensor 15 are described.

The vibrator 47 is provided in a state of being connected to a positive electrode side terminal 47a provided on a power supply line 60E and to a negative electrode side terminal 47b provided on a ground line 60N to be described later, and includes a motor (not shown) that rotates a rotation shaft according to a voltage input via the positive electrode side terminal 47a and the negative electrode side terminal 47b, and an eccentric weight (not shown) attached to the rotation shaft of the motor. When a voltage (for example, a low-voltage system voltage) is input to the vibrator 47 via the positive electrode side terminal 47a and the negative electrode side terminal 47b, the motor and the eccentric weight are rotated to generate vibration. The vibrator 47 is an example of a first load in the present invention.

In the present description, the term "positive electrode side" means a higher potential side than the "negative electrode side". That is, in the following description, the term "positive electrode side" may be read as "high potential side". Further, in the present description, the term "negative electrode side" means a lower potential side than the "positive electrode side". That is, in the following description, the term "negative electrode side" may be read as "low potential side".

The vibrator 47 is provided in a state of being provided in the power supply unit 10. The positive electrode side terminal 47a and the negative electrode side terminal 47b are connected to a terminal of the vibrator 47 by, for example, soldering. That is, the positive electrode side terminal 47a and the negative electrode side terminal 47b are connectors that connect the vibrator 47 such that the vibrator 47 is unremovable (or is difficult to be removed). The positive electrode side terminal 47a and the negative electrode side terminal 47b are examples of a first connector in the present invention. The term unremovable (or difficult to be removed) refers to a mode in which the power supply unit 10 cannot be removed as long as the power supply unit 10 is assumed to be used.

The first DC/DC converter 63 is an IC having a function of generating a first high-voltage system voltage from an input standard system voltage and outputting the generated first high-voltage system voltage. Here, the first high-voltage system voltage is a voltage higher than the standard system voltage as described above. That is, the first DC/DC converter 63 boosts the input standard system voltage to the first high-voltage system voltage and outputs the first high-voltage system voltage. The first high-voltage system voltage is, for example, a voltage suitable for heating the load 21, and is 4.2 [V] as an example.

The first DC/DC converter 63 includes a plurality of pins (terminals) for electrically connecting an inside and an outside of the first DC/DC converter 63. Specifically, the first DC/DC converter 63 includes a VIN pin (indicated by "VIN" in FIG. 4), an SW pin (indicated by "SW" in FIG. 4), a GND pin (indicated by "GND" in FIG. 4), a VOUT pin (indicated by "VOUT" in FIG. 4), a MODE pin (indicated by "MODE" in FIG. 4), and an EN pin (indicated by "EN" in FIG. 4). It should be noted that, in the present embodiment, only main pins among pins provided in the first DC/DC converter 63 are described.

The second DC/DC converter 64 is an IC having a function of generating a second high-voltage system voltage from the input standard system voltage and outputting the generated second high-voltage system voltage. Here, the second high-voltage system voltage is a voltage higher than the standard system voltage as described above. That is, the second DC/DC converter 64 boosts the input standard system voltage to the second high-voltage system voltage and outputs the second high-voltage system voltage. Further, the second high-voltage system voltage is a voltage even higher than the first high-voltage system voltage, and is, for example, a voltage suitable for operating the OLED panel 46. An example of the second high-voltage system voltage is 15 [V].

The second DC/DC converter 64 includes a plurality of pins (terminals) for electrically connecting an inside and an outside of the second DC/DC converter 64. Specifically, the second DC/DC converter 64 includes a VIN pin (indicated by "VIN" in FIG. 4), an SW pin (indicated by "SW" in FIG. 4), a GND pin (indicated by "GND" in FIG. 4), a VOUT pin (indicated by "VOUT" in FIG. 4), and an EN pin (indicated by "EN" in FIG. 4). It should be noted that, in the present embodiment, only main pins among pins provided in the second DC/DC converter 64 are described.

The display driver 65 is an IC having a function of operating by using an input low-voltage system voltage as a power supply, and supplying a second high-voltage system voltage to the OLED panel 46 while controlling the OLED panel 46 so as to control a display of the display 16.

The display driver 65 includes a plurality of pins (terminals) for electrically connecting an inside and an outside of the display driver 65. Specifically, the display driver 65 includes a VDD pin (indicated by "VDD" in FIG. 4), a VSS pin (indicated by "VSS" in FIG. 4), a VCC_C pin (indicated by "VCC_C" in FIG. 4), an SDA pin (indicated by "SDA" in FIG. 4), an SCL pin (indicated by "SCL" in FIG. 4), and an IXS pin (indicated by "IXS" in FIG. 4). It should be noted that, in the present embodiment, only main pins among pins provided in the display driver 65 are described.

The components of the power supply unit 10 described above are electrically connected to one another by a lead wire or the like provided on the circuit board 60 of the power supply unit 10. Hereinafter, electrical connection of the components of the power supply unit 10 will be described in detail.

The A1 pin, the A12 pin, the B1 pin, and the B12 pin of the charging terminal 43 are ground pins. The A1 pin and the B12 pin are connected in parallel and grounded by the ground line 60N. Similarly, the A12 pin and the B1 pin are also connected in parallel and grounded by the ground line 60N. In FIG. 4, the ground line 60N (that is, a line having a potential of substantially 0 [V]) is indicated by a thick solid line.

The A4 pin, the A9 pin, the B4 pin, and the B9 pin of the charging terminal 43 are pins that receive an input of power from a plug of an external power supply inserted into the charging terminal 43 to the power supply unit 10. For example, when the plug is inserted into the charging terminal 43, predetermined USB bus power is supplied to the power supply unit 10 from the inserted plug via the A4 pin and the B9 pin, or the A9 pin and the B4 pin. Further, power corresponding to USB power delivery (USB PD) may be supplied to the power supply unit 10 from the plug of the external power supply inserted into the charging terminal 43.

Specifically, the A4 pin and the B9 pin are connected in parallel and connected to the IN pin of the protection IC 61 via the power supply line 60A. The IN pin of the protection IC 61 is a power supply pin of the protection IC 61 on a positive electrode side. Further, the A9 pin and the B4 pin are also connected in parallel, and connected to the IN pin of the protection IC 61 via the power supply line 60A.

The power supply line 60A is connected to the ground line 60N via a variable resistor (a nonlinear resistance element) VR1. Here, the variable resistor is an element that includes two terminals (electrodes), has a relatively high electric resistance value when a voltage between the two terminals is lower than a predetermined variable resistor voltage (for example, 27 [V] in a case of the present embodiment), and has a property in which the electric resistance value rapidly decreases when the voltage between the two terminals is equal to or higher than the variable resistor voltage.

Specifically, one end of the variable resistor VR1 is connected to a node N11 provided in the power supply line 60A, and the other end of the variable resistor VR1 is connected to the ground line 60N. Here, the node N11 is provided in the power supply line 60A on a protection IC 61 side with respect to a node connected to the A4 pin and the B9 pin and a node connected to the A9 pin and the B4 pin. Therefore, for example, even when static electricity is generated in the A4 pin, the A9 pin, the B4 pin, or the B9 pin due to friction between the charging terminal 43 and the plug when the plug is inserted into the charging terminal 43, the static electricity can be released to the ground line 60N via the variable resistor VR1 to protect the protection IC 61.

The power supply line 60A is connected to the ground line 60N via a capacitor CD1 that functions as a decoupling capacitor (also referred to as a bypass capacitor or a smoothing capacitor). Accordingly, a voltage input to the protection IC 61 via the power supply line 60A can be stabilized. Specifically, one end of the capacitor CD1 is connected to a node N12 provided in the power supply line 60A, and the other end of the capacitor CD1 is connected to the ground line 60N. Here, the node N12 is provided in the power supply line 60A on the protection IC 61 side with respect to the node N11. Therefore, even when static electricity is generated at the A4 pin, the A9 pin, the B4 pin, or the B9 pin, the variable resistor VR1 can protect the capacitor CD1 from the static electricity. That is, in the power supply line 60A, by providing the node N12 on the protection IC 61 side with respect to the node N11, it is possible to achieve both protection of the protection IC 61 from overvoltage and a stable operation of the protection IC 61.

The A6 pin, the A7 pin, the B6 pin, and the B7 pin of the charging terminal 43 are pins used for input and output of a signal for communication between the power supply unit 10 and an external apparatus. In the present embodiment, serial communication in which signals are transmitted differentially by two signal lines Dp (also referred to as D+) and Dn (also referred to as D−) is used for communication between the power supply unit 10 and the external apparatus.

The A6 pin and the B6 pin are pins corresponding to a signal line on a Dp side. The A6 pin and the B6 pin are connected in parallel, and are connected to the PA12 pin of the MCU 50 via a resistor R1. The resistor R1 is an element that is configured with a resistance element, a transistor, or the like and has a predetermined electric resistance value. Further, the PA12 pin of the MCU 50 is a pin used for input and output of a signal of the MCU 50. Therefore, a signal on the Dp side from the external apparatus can be input to the MCU 50 via the A6 pin or the B6 pin. Further, the signal on the Dp side from the MCU 50 can be output to the external apparatus via the A6 pin or the B6 pin.

The A6 pin and the B6 pin are also connected to the ground line 60N via a variable resistor VR2. Therefore, for example, even when static electricity is generated in the A6 pin and the B6 pin due to the friction between the charging terminal 43 and the plug when the plug is inserted into the charging terminal 43, the static electricity can be released to the ground line 60N via the variable resistor VR2 to protect the MCU 50. Further, since the resistor R1 is provided between the pins A6 and B6 and the MCU 50, the resistor R1 can also prevent input of a high voltage to the MCU 50 and protect the MCU 50.

The A7 pin and the B7 pin are pins corresponding to a signal line on a Dn side. The A7 pin and the B7 pin are connected in parallel and connected to the PA11 pin of the MCU 50 via a resistor R2. The resistor R2 is an element that is configured with a resistance element, a transistor, or the like and has a predetermined electric resistance value. Further, the PA11 pin of the MCU 50 is a pin used for input and output of a signal of the MCU 50. Therefore, a signal on the Dn side from the external apparatus can be input to the MCU 50 via the A7 pin or the B7 pin. Further, the signal on the Dn side from the MCU 50 can be output to the external apparatus via the A7 pin or the B7 pin.

The A7 pin and the B7 pin are also connected to the ground line 60N via a variable resistor VR3. Therefore, for example, even when static electricity is generated in the A7 pin or the B7 pin due to the friction between the charging terminal 43 and the plug when the plug is inserted into the charging terminal 43, the static electricity can be released to the ground line 60N via the variable resistor VR3 to protect the MCU 50. Further, since the resistor R2 is provided between the pins A7 and B7 and the MCU 50, the resistor R2 can also prevent input of a high voltage to the MCU 50 and protect the MCU 50.

The A5 pin and the B5 pin of the charging terminal 43 are pins used to detect an upper-lower direction of the plug inserted into the charging terminal 43. For example, the A5 pin is a pin corresponding to a signal line of a first configuration channel (CC) signal (a CC1 signal), and the B5 pin is a pin corresponding to a signal line of a second CC signal (a CC2 signal). The A5 pin is connected to the ground line 60N via the resistor R3, and the B5 pin is connected to the ground line 60N via a resistor R4.

The A8 pin and the B8 pin of the charging terminal 43 are not connected to the electric circuit of the power supply unit 10. Therefore, the A8 pin and the B8 pin are not used and may also be omitted.

As described above, the IN pin of the protection IC 61 is the power supply pin of the protection IC 61 on the positive electrode side and is connected to the power supply line 60A. The VSS pin of the protection IC 61 is a power supply pin of the protection IC 61 on a negative electrode side and is connected to the ground line 60N. Further, the GND pin of the protection IC 61 is a ground pin of the protection IC 61 and is connected to the ground line 60N. Accordingly, when the plug of the external power supply is inserted into the charging terminal 43, power (for example, USB bus power) is supplied to the protection IC 61 via the power supply line 60A.

The OUT pin of the protection IC 61 is a pin from which a voltage input to the IN pin of the protection IC 61 is output as it is or a voltage (for example, 5.5±0.2 [V]) converted by the protection IC 61 is output, and is connected to the IN pin of the charging IC 55 via the power supply line 60B. The IN pin of the charging IC 55 is a power supply pin of the charging IC 55 on a positive electrode side. Accordingly, an appropriate voltage converted by the protection IC 61 is supplied to the charging IC 55.

The power supply line 60B is connected to the ground line 60N via a capacitor CD2 that functions as a decoupling capacitor. Accordingly, a voltage input to the charging IC 55 via the power supply line 60B can be stabilized.

The VBAT pin of the protection IC 61 is a pin used by the protection IC 61 for detecting presence or absence of connection of the power supply 12, and is connected to a positive electrode side terminal 12a of the power supply 12 via a resistor R5. The resistor R5 is an element that is configured with a resistance element, a transistor, or the like and has a predetermined electric resistance value. The protection IC 61 can detect that the power supply 12 is connected based on a voltage input to the VBAT pin.

The CE pin of the protection IC 61 is a pin for turning on/off an operation (various functions) of the protection IC 61. Specifically, the protection IC 61 operates when a low-level voltage is input to the CE pin, and stops the operation when a high-level voltage is input to the CE pin. In the present embodiment, the CE pin of the protection IC 61 is connected to the ground line 60N so that the low-level voltage is always input. Therefore, the protection IC 61 always operates during a supply of power, and performs conversion to a predetermined voltage, overcurrent detection, overvoltage detection, and the like.

Instead of the protection IC 61 in the present embodiment, a protection IC that operates when a high-level voltage is input to a CE pin and stops the operation when a low-level voltage is input to the CE pin may be used. However, in this case, it should be noted that the CE pin of the protection IC needs to be connected to the power supply line 60B or the power supply line 60A instead of the ground line 60N.

As described above, the IN pin of the charging IC 55 is the power supply pin of the charging IC 55 on the positive electrode side, and is connected to the power supply line 60B. Further, the charging IC 55 is connected to the ground line 60N by, for example, a power supply pin on a negative electrode side (not shown). Accordingly, a voltage output from the protection IC 61 is supplied to the charging IC 55 via the power supply line 60B.

The BAT_1 pin and the BAT_2 pin of the charging IC 55 are pins used to transmit and receive power between the charging IC 55 and the power supply 12, and are connected to the positive electrode side terminal 12a of the power supply 12 via a power supply line 60C. A negative electrode side terminal 12b of the power supply 12 is connected to the ground line 60N.

Specifically, the BAT_1 pin and the BAT_2 pin are connected in parallel, connected to the positive electrode side terminal 12a, and connected to the ground line 60N via a capacitor CD3. When the power supply 12 is discharged, electric charge is accumulated in the capacitor CD3, and a voltage output from the power supply 12 is input to the BAT_1 pin and the BAT_2 pin. Further, when the power supply 12 is charged, a voltage for charging the power supply 12 is output from the BAT_1 pin and the BAT_2 pin, and is applied to the positive electrode side terminal 12a of the power supply 12 via the power supply line 60C.

The power supply line 60C is connected to the ground line 60N via a capacitor CD4 that functions as a decoupling capacitor. Accordingly, a voltage input to the power supply 12 via the power supply line 60C can be stabilized.

The ISET pin of the charging IC 55 is a pin for setting a value of a current output from the charging IC 55 to the power supply 12. In the present embodiment, the ISET pin is connected to the ground line 60N via a resistor R6. Here, the resistor R6 is an element that is configured with a resistance element, a transistor, or the like and has a predetermined electric resistance value.

The charging IC 55 outputs, to the power supply 12, a current having a current value corresponding to an electric resistance value of the resistor R6 connected to the ISET pin.

The TS pin of the charging IC 55 is a pin to which a voltage value applied to a resistor connected to the TS pin is input and that is used to detect an electric resistance value and a temperature of the resistor connected to the TS pin based on the voltage value. In the present embodiment, the TS pin is connected to the ground line 60N via a resistor R7. Here, the resistor R7 is an element that is configured with a resistance element, a transistor, or the like and has a predetermined electric resistance value. Therefore, the charging IC 55 can detect an electric resistance value and a temperature of the resistor R7 based on a voltage value applied to the resistor R7.

The CHG pin of the charging IC 55 is a pin that outputs information on a charging state of the power supply 12 (hereinafter, also referred to as charging state information), such as during charging, during a charging stop, and charging completion, and information on a remaining capacity of the power supply 12 (hereinafter, also referred to as remaining capacity information). The CHG pin of the charging IC 55 is connected to the PB15 pin of the MCU 50. The PB15 pin of the MCU 50 is a pin used to input a signal of the MCU 50. Therefore, the charging IC 55 can notify the MCU 50 of the charging state, the remaining capacity, and the like of the power supply 12 by outputting the charging state information and the remaining capacity information from the CHG pin to the MCU 50.

The OUT_1 pin and the OUT 2 pin of the charging IC 55 are pins from which the standard system voltage is output, and are connected to the IN pin of the LDO regulator 62, the VIN pin of the first DC/DC converter 63, and the VIN pin of the second DC/DC converter 64 via a power supply line 60D. The IN pin of the LDO regulator 62 is a power supply pin of the LDO regulator 62 on a positive electrode side. Further, the VIN pin of the first DC/DC converter 63 is a power supply pin of the first DC/DC converter 63 on a positive electrode side. Then, the VIN pin of the second DC/DC converter 64 is a power supply pin of the second DC/DC converter 64 on a positive electrode side.

Specifically, the OUT_1 pin is connected to the ground line 60N and to the OUT 2 pin via a capacitor CD5 that functions as a decoupling capacitor. Then, the OUT_1 pin and the OUT 2 pin are connected to the ground line 60N via a capacitor CD6 that functions as a decoupling capacitor, and are connected to the IN pin of the LDO regulator 62, the VIN pin of the first DC/DC converter 63, and the VIN pin of the second DC/DC converter 64.

Accordingly, the charging IC 55 can supply a stable standard system voltage to the LDO regulator 62, the first DC/DC converter 63, and the second DC/DC converter 64.

In the present embodiment, a capacitor CD7 that functions as a decoupling capacitor is also provided immediately before the first DC/DC converter 63 of the power supply line 60D. Accordingly, a stable standard system voltage can be supplied to the first DC/DC converter 63, and a power supply from the first DC/DC converter 63 to the load 21 can be stabilized.

The ILIM pin of the charging IC 55 is a pin for setting an upper limit of a value of a current output from the charging IC 55 to the LDO regulator 62, the first DC/DC converter 63, and the second DC/DC converter 64. In the present embodiment, the ILIM pin is connected to the ground line 60N via the resistor R7. Here, the resistor R7 is the element that is configured with the resistance element, the transistor, or the like and has a predetermined electric resistance value.

The charging IC 55 outputs, to the LDO regulator 62, the first DC/DC converter 63, and the second DC/DC converter 64, a current whose upper limit is a current value corresponding to the electric resistance value of the resistor R7 connected to the ILIM pin. More specifically, the charging IC 55 outputs the current having the current value corresponding to the electric resistance value of the resistor R6 connected to the ISET pin from the OUT_1 pin and the OUT_2 pin, and stops outputting the current from the OUT_1 pin and the OUT_2 pin when the current value reaches a current value corresponding to the electric resistance value of the resistor R7 connected to the ILIM pin. That is, a manufacturer of the aerosol inhaler 1 can set an upper limit value of the current output from the charging IC 55 to the LDO regulator 62, the first DC/DC converter 63, and the second DC/DC converter 64 by the electric resistance value of the resistor R7 connected to the ILIM pin.

An LED circuit C1 is provided by branching from the power supply line 60D. The LED circuit C1 is configured by connecting a resistor R8, an LED 70, and a switch SW1 in series. Here, the resistor R8 is an element that is configured with a resistance element, a transistor, or the like and has a predetermined electric resistance value. The resistor R8 is mainly used to limit a voltage applied to the LED 70 and/or a current supplied to the LED 70. The LED 70 is a light-emitting portion provided at a position corresponding to the remaining amount check window 11*w* inside the power supply unit 10, and configured to illuminate an outside of the power supply unit 10 from an inside of the power supply unit 10 via the remaining amount check window 11*w*. When the LED 70 emits light, visibility of a remaining amount of the first cartridge 20 (specifically, a remaining amount of the aerosol source 22 stored in the first cartridge 20) via the remaining amount check window 11*w* is improved. The switch SW1 is, for example, a switch configured with a MOSFET or the like.

One end of the LED circuit C1 on a resistor R8 side, that is, one end of the resistor R8 is connected to a node N21 provided in the power supply line 60D. The other end of the resistor R8 constitutes a connector 70*a* and is connected to a terminal of the LED 70 on an anode side. One end of the switch SW1 constitutes a connector 70*b* and is connected to a terminal of the LED 70 on a cathode side. The other end of the LED circuit C1 on a switch SW1 side, that is, the other end of the switch SW1 is connected to the ground line 60N. The LED 70 is an example of a third load in the present invention, and the connector 70*a* and the connector 70*b* are examples of a third connector in the present invention.

The switch SW1 is also connected to the MCU 50 as will be described later, is turned on in response to an on command of the MCU 50, and is turned off in response to an off command of the MCU 50. The LED circuit C1 is in a conductive state when the switch SW1 is turned on. Then, the LED 70 emits light when the LED circuit C1 is in the conductive state.

As described above, the IN pin of the LDO regulator 62 is the power supply pin of the LDO regulator 62 on the positive electrode side, and is connected to the power supply line 60D. The GND pin of the LDO regulator 62 is a ground pin of the LDO regulator 62 and is connected to the ground line 60N. Accordingly, the standard system voltage output from the charging IC 55 is supplied to the LDO regulator 62 via the power supply line 60D.

The OUT pin of the LDO regulator 62 is a pin that outputs a low-voltage system voltage generated by the LDO regulator 62, and is connected to the VDD pin and the VDD_USB pin of the MCU 50, the VCC pin of the intake sensor 15, the VDD pin and the IXS pin of the display driver 65, and the positive electrode side terminal 47*a* connected to the vibrator 47 via the power supply line 60E. The VDD pin and the VDD_USB pin of the MCU 50 are power supply pins of the MCU 50 on a positive electrode side. Further, the VCC pin of the intake sensor 15 is a power supply pin of the intake sensor 15 on a positive electrode side. Then, the VDD pin of the display driver 65 is a power supply pin of the display driver 65 on a positive electrode side. Accordingly, the LDO regulator 62 can supply the low-voltage system voltage to the MCU 50, the intake sensor 15, the display driver 65, and the vibrator 47.

The EN pin of the LDO regulator 62 is a pin for turning on/off an operation (a function) of the LDO regulator 62. Specifically, the LDO regulator 62 operates when a high-level voltage is input to the EN pin, and stops the operation when the high-level voltage is not input to the EN pin.

In the present embodiment, the EN pin of the LDO regulator 62 is connected to the power supply line 60D and also connected to the ground line 60N via a capacitor CD8. Therefore, when the standard system voltage is output from the charging IC 55, electric charge is accumulated in the capacitor CD8, the high-level voltage is input to the EN pin of the LDO regulator 62, the LDO regulator 62 operates, and the low-voltage system voltage is output from the LDO regulator 62.

That is, in the power supply unit 10, the capacitor CD8 connected to the EN pin of the LDO regulator 62 can be charged by power from the charging IC 55, and a high-level signal can be input to the EN pin of the LDO regulator 62. Accordingly, even when the LDO regulator 62 and the MCU 50 are in a stopped state due to power shortage of the power supply 12, the LDO regulator 62 can be reactivated by power from the external power supply, and the MCU 50 can also be reactivated by power from the LDO regulator 62.

As described above, the VDD pin and the VDD_USB pin of the MCU 50 are power supply pins of the MCU 50 on the positive electrode side, and are connected to the power supply line 60E. The VSS pin of the MCU 50 is a power supply pin of the MCU 50 on a negative electrode side and is connected to the ground line 60N. Accordingly, a low-voltage system voltage output from the LDO regulator 62 is supplied to the MCU 50 via the power supply line 60E. The VDD pin and the VDD_USB pin may be combined as one pin.

A thermistor circuit C2 is provided by branching from the power supply line 60E. The thermistor circuit C2 is configured by connecting a switch SW2, a resistor R9, and a thermistor TH in series. One end of the thermistor circuit C2 on a switch SW2 side is connected to a node N31 provided in the power supply line 60E. Further, the other end of the thermistor circuit C2 on a thermistor TH side is connected to the ground line 60N.

Here, the switch SW2 is a switch configured with, for example, a MOSFET or the like. The switch SW2 is connected to the MCU 50 as will be described later, is turned on in response to the on command of the MCU 50, and is turned off in response to the off command of the MCU 50. The thermistor circuit C2 is in a conductive state when the switch SW2 is turned on.

The resistor R9 is an element that is configured with a resistance element, a transistor, or the like and has a predetermined electric resistance value. The thermistor TH includes an element having negative temperature coefficient (NTC) characteristics or positive temperature coefficient (PTC) characteristics, that is, an element having a correlation between an electric resistance value and a temperature, and the like. The thermistor TH is disposed in the vicinity of the power supply 12 in a state where a temperature of the power supply 12 can be detected.

The PC1 pin of the MCU 50 is connected to a node N32 provided between the resistor R9 and the thermistor TH in the thermistor circuit C2. When the thermistor circuit C2 is in the conductive state (that is, when the switch SW2 is turned on), a voltage divided by the resistor R9 and the thermistor TH is input to the PC1 pin. The MCU 50 can detect a temperature of the thermistor TH, that is, the temperature of the power supply 12, based on a voltage value input to the PC1 pin.

The PA8 pin of the MCU 50 is a pin that is connected to the switch SW2 and outputs an on command to turn on the switch SW2 and an off command to turn off the switch SW2. The MCU 50 can turn on the switch SW2 to put the thermistor circuit C2 in the conductive state by outputting the on command from the PA8 pin. Further, the MCU 50 can turn off the switch SW2 to put the thermistor circuit C2 in a non-conductive state by outputting the off command from the PA8 pin. As a specific example, when the switch SW2 is a switch configured with a MOSFET, the PA8 pin of the MCU 50 is connected to a gate terminal of the MOSFET.

Then, the MCU 50 can control on/off of the switch SW2 by controlling a gate voltage (that is, an output from the PA8 pin) applied to the gate terminal.

In the power supply line 60E, the switch SW3 is provided in front of the positive electrode side terminal 47a. Here, the switch SW3 is a switch configured with, for example, a MOSFET or the like. The switch SW3 is connected to the MCU 50, is turned on in response to the on command of the MCU 50, and is turned off in response to the off command of the MCU 50.

Specifically, the PC6 pin of the MCU 50 is a pin that is connected to the switch SW3 and outputs an on command to turn on the switch SW3 and an off command to turn off the switch SW3. When the on command is output from the PC6 pin, the MCU 50 can turn on the switch SW3, supply power to the vibrator 47 by the power supply line 60E, and vibrate the vibrator 47. Further, when the off command is output from the PC6 pin, the MCU 50 can turn off the switch SW3, and stop the supply of power to the vibrator 47 by the power supply line 60E (that is, the vibration of the vibrator 47). As a specific example, when the switch SW3 is a switch configured with a MOSFET, the PC6 pin of the MCU 50 is connected to a gate terminal of the MOSFET. Then, the MCU 50 can control on/off of the switch SW3 by controlling a gate voltage (that is, an output from the PC6 pin) applied to the gate terminal.

A Zener diode D is connected to the power supply line 60E. Here, the Zener diode is a diode that includes two terminals (electrodes) on an anode side and a cathode side, and in which a current rapidly flows from the cathode side to the anode side when a voltage of a terminal on the anode side exceeds a predetermined Zener voltage (also referred to as a breakdown voltage, for example, in a case of the present embodiment, a voltage lower than the variable resistor voltage described above).

Specifically, one end of the Zener diode D on the anode side is connected to the ground line 60N, and the other end of the Zener diode D on the cathode side is connected to a node N41 provided in the power supply line 60E. Here, the node N41 is provided between the switch SW3 and the positive electrode side terminal 47a in the power supply line 60E. Accordingly, even when a counter-electromotive force having a voltage higher than the Zener voltage of the Zener diode D is generated from the vibrator 47 when the vibrator 47 is turned on/off, as indicated by an arrow of a reference numeral C3 in FIG. 4, a current due to the counter-electromotive force can flow through a closed circuit formed by the vibrator 47 and the Zener diode D. Therefore, it is possible to prevent the current due to the counter-electromotive force from flowing to an outside of the closed circuit formed by the vibrator 47 and the Zener diode D, and to protect the electronic components of the power supply unit 10 such as the power supply 12 and the LDO regulator 62 provided outside the closed circuit.

A capacitor CD9 may be connected to the power supply line 60E. Specifically, in this case, one end of the capacitor CD9 is connected to a node N42 provided in the power supply line 60E, and the other end of the capacitor CD9 is connected to the ground line 60N. Here, the node N42 is provided on a positive electrode side terminal 47a side with respect to the node N41 in the power supply line 60E. In this way, the capacitor CD9 can be disposed in the closed circuit formed by the vibrator 47 and the Zener diode D described above, and the capacitor CD9 can also protect the electronic components of the power supply unit 10 such as the power supply 12 and the LDO regulator 62 provided outside the closed circuit formed by the vibrator 47 and the Zener diode D. The capacitor CD9 may not be provided in the closed circuit described above, but may be provided in the vicinity of the closed circuit. As a specific example, the capacitor CD9 may be provided between the switch SW3 and the Zener diode D. Even in this way, the capacitor CD9 and the Zener diode D can protect the electronic components of the power supply unit 10 such as the power supply 12 and the LDO regulator 62.

The PB3 pin of the MCU 50 is a pin that is connected to the EN pin of the first DC/DC converter 63 and outputs a predetermined voltage signal. The MCU 50 can turn on/off the operation of the first DC/DC converter 63 by the voltage signal output from the PB3 pin. Specifically, the MCU 50 can cause the first DC/DC converter 63 to operate (that is, enable the first DC/DC converter 63) by outputting a high-level voltage signal from the PB3 pin. Further, the MCU 50 can stop the operation of the first DC/DC converter 63 (that is, disable the first DC/DC converter 63) by outputting a low-level voltage signal from the PB3 pin.

The PB4 pin of the MCU 50 is a pin that is connected to the switch SW4 described later and provided between the first DC/DC converter 63 and the discharging terminal 41, and that outputs an on command to turn on the switch SW4 and an off command to turn off the switch SW4. The MCU 50 can supply power to the load 21 as will be described later by outputting the on command from the PB4 pin to turn on the switch SW4. Further, the MCU 50 can stop the supply of power to the load 21 by outputting the off command from the PB4 pin to turn off the switch SW4. As a specific example, when the switch SW4 is a switch configured with a MOSFET, the PB4 pin of the MCU 50 is connected to a gate terminal of the MOSFET. Then, the MCU 50 can control on/off of the switch SW4 by controlling a gate voltage (that is, an output from the PB4 pin) applied to the gate terminal.

As described above, the PB15 pin of the MCU 50 is a pin that is connected to the CHG pin of the charging IC 55 and receives input of the charging state information and the remaining capacity information output by the charging IC 55.

The PA0 pin of the MCU 50 is a pin that is connected to the switch SW1 of the LED circuit C1 and outputs an on command to turn on the switch SW1 and an off command to turn off the switch SW1. The MCU 50 can put the LED circuit C1 in a conductive state to cause the LED 70 to emit light (be turned on) by outputting the on command from the PA0 pin to turn on the switch SW1. Further, the MCU 50 can put the LED circuit C1 in a non-conductive state to turn off the LED 70 by outputting the off command from the PA0 pin to turn off the switch SW1. As a specific example, when the switch SW1 is a switch configured with a MOSFET, the PA0 pin of the MCU 50 is connected to a gate terminal of the MOSFET. Then, the MCU 50 can control on/off of the switch SW1 by controlling a gate voltage (that is, an output from the PA0 pin) applied to the gate terminal. Further, the MCU 50 can switch between the conductive state and the non-conductive state of the LED circuit C1 at a high speed to cause the LED 70 to blink by outputting while switching the on command and the off command from the PA0 pin at a high speed.

The PC5 pin of the MCU 50 is a pin that is connected to the OUT pin of the intake sensor 15 and receives an output of the intake sensor 15 (that is, a signal indicating a detection result of the intake sensor 15).

The PA11 pin and the PA12 pin of the MCU 50 are pins used for input and output of a signal for communication between the power supply unit 10 and the external apparatus. Specifically, as described above, the PA11 pin is connected to the A7 pin and the B7 pin of the charging terminal 43 via the resistor R2, and is used for input and output of a signal on the Dn side. Further, as described above, the PA12 pin is connected to the A6 pin and the B6 pin of the charging terminal 43 via the resistor R1, and is used for input and output of a signal on the Dp side.

The PC12 pin of the MCU 50 is a pin that is connected to the EN pin of the second DC/DC converter 64 and outputs a predetermined voltage signal. The MCU 50 can turn on/off an operation of the second DC/DC converter 64 by the voltage signal output from the PC12 pin. Specifically, the MCU 50 can cause the second DC/DC converter 64 to operate (that is, enable the second DC/DC converter 64) by outputting a high-level voltage signal from the PC12 pin. Further, the MCU 50 can stop the operation of the second DC/DC converter 64 (that is, disable the second DC/DC converter 64) by outputting a low-level voltage signal from the PC12 pin.

The PB8 pin and the PB9 pin of the MCU 50 are pins used to output a signal for communication between the MCU 50 and another IC, and are used for communication between the MCU 50 and the display driver 65 in the present embodiment. Specifically, in the present embodiment, the MCU 50 and the display driver 65 perform inter-integrated circuit (I2C) communication. The PB8 pin is used to output a signal of the I2C communication on an SCL side, and the PB9 pin is used to output a signal of the I2C communication on an SDA side. The MCU 50 can control the display driver 65 by the signals output from the PB8 pin and the PB9 pin to control a display content of the display 16 (the OLED panel 46).

As described above, the VCC pin of the intake sensor 15 is the power supply pin of the intake sensor 15 on the positive electrode side, and is connected to the power supply line 60E. The GND pin of the intake sensor 15 is a ground pin of the intake sensor 15 and is connected to the ground line 60N. Accordingly, the low-voltage system voltage output from the LDO regulator 62 is supplied to the intake sensor 15 via the power supply line 60E.

As described above, the OUT pin of the intake sensor 15 is a pin that outputs the signal indicating the detection result of the intake sensor 15, and is connected to the PC5 pin of the MCU 50. Accordingly, the intake sensor 15 can notify the MCU 50 of the detection result.

As described above, the VIN pin of the first DC/DC converter 63 is the power supply pin of the first DC/DC converter 63 on the positive electrode side, and is connected to the power supply line 60D. Further, the VIN pin of the first DC/DC converter 63 is also connected to the SW pin (the switch pin) of the first DC/DC converter 63 via a coil CL1. The GND pin of the first DC/DC converter 63 is a ground pin of the first DC/DC converter 63, and is connected to the ground line 60N.

The VOUT pin of the first DC/DC converter 63 is a pin that outputs the first high-voltage system voltage generated by the first DC/DC converter 63, and is connected to the positive electrode side discharging terminal 41a of the discharging terminal 41 via a power supply line 60F. The negative electrode side discharging terminal 41b of the discharging terminal 41 is connected to the ground line 60N.

The switch SW4 is provided in the power supply line 60F. The switch SW4 is, for example, a switch configured with a MOSFET or the like, and more specifically, is a power MOSFET having a high switching speed. The switch SW4 is connected to the MCU 50 as described above, is turned on in response to the on command of the MCU 50, and is turned off in response to the off command of the MCU 50. When the switch SW4 is turned on, the power supply line 60F is in a conductive state, and the first high-voltage system voltage is supplied to the load 21 via the power supply line 60F.

A variable resistor VR4 is connected to the power supply line 60F. Specifically, one end of the variable resistor VR4 is connected to a node N51 provided in the power supply line 60F, and the other end of the variable resistor VR4 is connected to the ground line 60N. Here, the node N51 is provided on a positive electrode side discharging terminal 41*a* side with respect to the switch SW4, that is, on an output side of the switch SW4 in the power supply line 60F. In other words, the variable resistor VR4 is connected between the discharging terminal 41 and the power supply 12, more specifically, between the discharging terminal 41 and the first DC/DC converter 63 (more specifically, the switch SW4).

Therefore, for example, even when static electricity is generated in the discharging terminal 41 due to friction between the discharging terminal 41 and the load 21 when the first cartridge 20 is replaced, the static electricity can be released to the ground line 60N via the variable resistor VR4 to protect the switch SW4, the first DC/DC converter 63, the power supply 12, and the like. Further, even when the variable resistor VR4 fails, the switch SW4 and the first DC/DC converter 63 can serve as a barrier against noise (in this case, the static electricity generated in the discharging terminal 41) for another element (for example, the charging IC 55) on a power supply 12 side with respect to the switch SW4 and the first DC/DC converter 63, and can protect another element.

A capacitor CD10 that functions as a decoupling capacitor is connected to the power supply line 60F. Specifically, one end of the capacitor CD10 is connected to a node N52 provided in the power supply line 60F, and the other end of the capacitor CD10 is connected to the ground line 60N. Here, the node N52 is provided between the node N51 and the switch SW4 in the power supply line 60F. In other words, the capacitor CD10 is connected to the output side of the switch SW4. Accordingly, power supply from the switch SW4 to the load 21 can be stabilized, and even when static electricity is generated in the discharging terminal 41, the variable resistor VR4 can protect the capacitor CD10 from the static electricity.

A capacitor CD11 that functions as a decoupling capacitor may be connected to the power supply line 60F. Specifically, in this case, one end of the capacitor CD11 is connected to a node N53 provided in the power supply line 60F, and the other end of the capacitor CD11 is connected to the ground line 60N. Here, the node N53 is provided between the switch SW4 and the first DC/DC converter 63 in the power supply line 60F. In other words, the capacitor CD11 is connected to an output side of the first DC/DC converter 63. Accordingly, power supply from the first DC/DC converter 63 to the switch SW4 (for example, the power MOSFET) can be stabilized. As a result, power supply to the load 21 can be stabilized.

As described above, the EN pin of the first DC/DC converter 63 is a pin for setting the operation of the first DC/DC converter 63 on/off and is connected to the PB3 pin of the MCU 50.

The MODE pin of the first DC/DC converter 63 is a pin for setting an operation mode of the first DC/DC converter 63. The first DC/DC converter 63 is, for example, a switching regulator, and can have a pulse width modulation mode (hereinafter, also referred to as a PWM mode) and a pulse frequency modulation mode (hereinafter, also referred to as a PFM mode) as operation modes. In the present embodiment, by connecting the MODE pin to the power supply line 60D, a high-level voltage is input to the MODE pin when the first DC/DC converter 63 can operate, and the first DC/DC converter 63 is set to operate in the PWM mode.

As described above, the VIN pin of the second DC/DC converter 64 is the power supply pin of the second DC/DC converter 64 on the positive electrode side, and is connected to the power supply line 60D. Further, the VIN pin of the second DC/DC converter 64 is also connected to the SW pin (the switch pin) of the second DC/DC converter 64 via a coil CL2. The GND pin of the second DC/DC converter 64 is a ground pin of the second DC/DC converter 64 and is connected to the ground line 60N.

The VOUT pin of the second DC/DC converter 64 is a pin that outputs the second high-voltage system voltage generated by the second DC/DC converter 64, and is connected to the VCC_C pin of the display driver 65 via a power supply line 60G. Accordingly, the second DC/DC converter 64 can supply the second high-voltage system voltage to the display driver 65.

A variable resistor VR5 is connected to the power supply line 60G. Specifically, one end of the variable resistor VR5 is connected to a node N61 provided in the power supply line 60G, and the other end of the variable resistor VR5 is connected to the ground line 60N. In other words, the variable resistor VR5 is connected between a connector portion connected to the VCC_C pin of the display driver 65 and the second DC/DC converter 64 in the power supply line 60G.

Therefore, even when static electricity is generated in the display 16 by contact of the display 16 exposed to an outside of the aerosol inhaler 1 with any object (for example, a hand of the user) and the static electricity flows back to a second DC/DC converter 64 side via the OLED panel 46 and the display driver 65, the static electricity can be released to the ground line 60N via the variable resistor VR5, and the second DC/DC converter 64 and the like can be protected from the static electricity. Further, even when the variable resistor VR5 fails, the second DC/DC converter 64 can serve as a barrier against noise (in this case, the static electricity generated in the display 16) for another element (for example, the LDO regulator 62) on the power supply 12 side with respect to the variable resistor VR5, and can protect another element. That is, in the power supply line 60G, by providing the node N62 on a second DC/DC converter side with respect to the node N61, it is possible to achieve both protection of the display driver 65 from overvoltage and a stable operation of the display driver 65.

From the same viewpoint, a variable resistor VR6 is also connected to the power supply line 60E. Specifically, one end of the variable resistor VR6 is connected to a node N43 provided in the power supply line 60E, and the other end of the variable resistor VR6 is connected to the ground line 60N. Here, the node N43 is provided between the LDO regulator 62 and the switch SW3 in the power supply line 60E. Therefore, even when static electricity is generated in the display 16 by contact of the display 16 exposed to the outside of the aerosol inhaler 1 with any object and the static electricity flows back to an LDO regulator 62 side via the OLED panel 46 and the display driver 65, the static electricity can be released to the ground line 60N via the variable resistor VR6, and the LDO regulator 62 can be protected from the static electricity.

A capacitor CD12 that functions as a decoupling capacitor is connected to the power supply line 60G. Specifically, one end of the capacitor CD12 is connected to a node N62 provided in the power supply line 60G, and the other end of the capacitor CD12 is connected to the ground line 60N. Here, the node N62 is provided on the second DC/DC converter 64 side with respect to the node N61 in the power supply line 60G. Accordingly, a stable second high-voltage system voltage can be supplied to the display driver 65, and even when static electricity is generated in the display 16, the variable resistor VR5 can protect the capacitor CD12 from the static electricity.

The EN pin of the second DC/DC converter 64 is a pin for setting the operation of the second DC/DC converter 64 on/off and is connected to the PC12 pin of the MCU 50 as described above.

As described above, the VDD pin of the display driver 65 is the power supply pin of the display driver 65 on the positive electrode side and is connected to the power supply line 60E. Further, the VS S pin of the display driver 65 is a power supply pin of the display driver 65 on a negative electrode side and is connected to the ground line 60N. Accordingly, the low-voltage system voltage output from the LDO regulator 62 is supplied to the display driver 65 via the power supply line 60E. The low-voltage system voltage supplied to the display driver 65 is used as a power supply for operating the display driver 65.

The VCC_C pin of the display driver 65 is a pin that receives the second high-voltage system voltage, and is connected to the VOUT pin of the second DC/DC converter 64 via the power supply line 60G as described above. When receiving the second high-voltage system voltage by the VCC_C pin, the display driver 65 supplies the received second high-voltage system voltage to the OLED panel 46 via a power supply line 60H. Accordingly, the display driver 65 can cause the OLED panel 46 to operate. The display driver 65 and the OLED panel 46 may also be connected by another line (not shown).

The SCL pin of the display driver 65 is a pin that receives a signal on an SCL side in I2C communication between the MCU 50 and the display driver 65, and is connected to the PB8 pin of the MCU 50 as described above. Further, the SDA pin of the display driver 65 is a pin that receives a signal on an SDA side in the I2C communication between the MCU 50 and the display driver 65, and is connected to the PB9 pin of the MCU 50 as described above.

The IXS pin of the display driver 65 is a pin for setting which of the I2C communication and serial peripheral interface (SPI) communication is used to perform communication between the display driver 65 and another IC (the MCU 50 in the present embodiment). In the present embodiment, by connecting the IXS pin to the power supply line 60E, a high-level voltage is input to the IXS pin, and the communication between the display driver 65 and the MCU 50 is set to be performed by the I2C communication. The communication between the display driver 65 and the MCU 50 may be set to be performed by the SPI communication by inputting a low-level voltage to the IXS pin.

(MCU)

Next, a configuration of the MCU 50 will be described with reference to FIG. 5.

As shown in FIG. 5, the MCU 50 includes an aerosol generation request detection unit 51, a temperature detection unit 52, a power control unit 53, and a notification control unit 54 as functional blocks implemented by the processor executing a program stored in a ROM (not shown).

The aerosol generation request detection unit 51 detects an aerosol generation request based on an output result of the intake sensor 15. The intake sensor 15 is configured to output a value of a change in a pressure (an internal pressure) in the power supply unit 10 caused by suction of the user through the suction port 32. The intake sensor 15 is, for example, a pressure sensor that outputs an output value (for example, a voltage value or a current value) corresponding to an internal pressure that changes according to a flow rate of air sucked from an intake port (not shown) toward the suction port 32 (that is, a puff operation of the user). The intake sensor 15 may be configured with a condenser microphone or the like. The intake sensor 15 may output an analog value or may output a digital value converted from the analog value. Further, the intake sensor 15 may transmit an output to the aerosol generation request detection unit 51 by using the I2C communication, the SPI communication, or the like described above.

The temperature detection unit 52 detects a temperature of the power supply 12 based on an input from the thermistor circuit C2. Specifically, the temperature detection unit 52 applies a voltage to the thermistor circuit C2 by turning on the switch SW2, and detects a temperature of the thermistor TH, that is, the temperature of the power supply 12 based on a voltage value input from the thermistor circuit C2 to the MCU 50 (for example, the PC1 pin) at that time. Further, for example, an electric resistance value of the load 21 may be configured to be detectable, and the temperature detection unit 52 may detect a temperature of the load 21.

The power control unit 53 controls a supply of power to the electronic components of the aerosol inhaler 1. For example, when the aerosol generation request detection unit 51 detects the aerosol generation request, the power control unit 53 causes the first DC/DC converter 63 to operate and controls switching of the switch SW4 to supply the first high-voltage system voltage to the load 21 via the positive electrode side discharging terminal 41a. Accordingly, the MCU 50 can supply power of the first high-voltage system voltage to the load 21, cause the load 21 to be heated (to function), and cause an aerosol to be generated. Then, in this way, power from the charging IC 55 (that is, power of the standard system voltage) is boosted to the first high-voltage system voltage by the first DC/DC converter 63 and supplied to the load 21, so that an amount of an aerosol generated by the load 21 and a flavor can be improved as compared with a case where the power from the charging IC 55 is supplied to the load 21 without being boosted.

The power control unit 53 supplies the standard system voltage to the vibrator 47 via the positive electrode side terminal 47a by turning on the switch SW3 at a predetermined timing. Accordingly, the MCU 50 can supply the power of the standard system voltage to the vibrator 47 to cause the vibrator 47 to vibrate (function).

The power control unit 53 supplies the second high-voltage system voltage to the OLED panel 46 via the display driver 65 by causing the second DC/DC converter 64 to operate at a predetermined timing. Accordingly, the MCU 50 can supply power of the second high-voltage system voltage to the OLED panel 46 to cause the OLED panel 46 to operate (function).

When the aerosol generation request detection unit 51 detects the aerosol generation request, the power control unit 53 further turns on the switch SW1 to put the LED circuit C1 in a conductive state, and causes the LED 70 to emit light (function). In this case, a voltage obtained by lowering the standard system voltage from the charging IC 55 by the resistor R8 is supplied to the connector 70a. That is, by turning on the switch SW1, the power control unit 53 can supply power of the voltage obtained by lowering the standard system voltage by the resistor R8 to the LED 70 via the connector 70a.

For example, the power control unit 53 performs control such that the power supplied to the LED 70 is smaller than power supplied to other electronic components such as the load 21, the OLED panel 46, and the vibrator 47. That is, the power control unit 53 performs control such that the power supplied to the connector 70a is smaller than the power supplied to the positive electrode side discharging terminal 41a, the positive electrode side terminal 47a, and the like. Accordingly, it is possible to supply appropriate power to the LED 70 with a simple configuration, and to implement high functionality of the aerosol inhaler 1 while preventing an increase in a manufacturing cost of the aerosol inhaler 1 (for example, the power supply unit 10).

The notification control unit 54 controls the notification unit 45 to notify various pieces of information. For example, the notification control unit 54 controls the notification unit 45 to notify a replacement timing of the second cartridge 30 in response to detection of the replacement timing of the second cartridge 30. The notification control unit 54 detects and notifies the replacement timing of the second cartridge 30 based on a cumulative number of times of the puff operation or a cumulative energization time to the load 21 stored in the memory 19. The notification control unit 54 may notify not only the replacement timing of the second cartridge 30, but also a replacement timing of the first cartridge 20, a replacement timing of the power supply 12, a charging timing of the power supply 12, and the like.

In a state where one unused second cartridge 30 is set, when the puff operation is performed a predetermined number of times, or when the cumulative energization time to the load 21 by the puff operation reaches a predetermined value (for example, 120 seconds), the notification control unit 54 may determine that the second cartridge 30 has been used (that is, the remaining amount is zero or empty), and may notify the replacement timing of the second cartridge 30.

When it is determined that all of the second cartridges 30 included in the one set have been used, the notification control unit 54 may determine that one first cartridge 20 included in the one set has been used (that is, the remaining amount is zero or empty), and may notify the replacement timing of the first cartridge 20. In addition to or instead of these, the notification control unit 54 may also notify a remaining amount of the first cartridge 20, a remaining amount of the second cartridge 30, a remaining capacity of the power supply 12, and the like.

(Overvoltage Protection According to Loads Provided in Aerosol Inhaler 1)

Finally, loads provided in the aerosol inhaler 1 and protection against an overvoltage and the like according to the loads are summarized. As shown in FIG. 6, the aerosol inhaler 1 includes the vibrator 47, the display 16, the first cartridge 20 (that is, the load 21), the LED 70, and the intake sensor 15 as loads that function (that is, operate) by a power supply.

The vibrator 47 is disposed inside the power supply unit case 11, and is provided in a state of not being exposed to the outside of the aerosol inhaler 1 (see "not exposed" for "exposed to outside" corresponding to the vibrator in FIG. 6). Therefore, the vibrator 47 does not generate noise that is due to static electricity generated when the vibrator 47 is in contact with any object outside the aerosol inhaler 1.

The vibrator 47 is provided in a state of being provided in the power supply unit 10, and is basically not attached to or detached from the power supply unit 10 (see "provided" for "connection to main body" corresponding to the vibrator in FIG. 6). Therefore, the vibrator 47 does not generate noise (ESD: Electro-Static Discharge) that is due to static electricity or a surge generated when the vibrator 47 is attached to or detached from the power supply unit 10.

The vibrator 47 generates a counter-electromotive force by being operated, and may become a noise source of noise due to the counter-electromotive force (see "presence" for "presence or absence of possibility of becoming noise source" and "counter-electromotive force" for "type of noise" corresponding to the vibrator in FIG. 6).

For the vibrator 47 having such characteristics as a load, by providing the Zener diode D having a polarity as a protection element (see "Zener diode" for "overvoltage protection element" corresponding to the vibrator in FIG. 6), it is possible to appropriately protect the system of the aerosol inhaler 1 (the power supply unit 10) from an overvoltage that may occur due to the vibrator 47.

The display 16 is formed on the upper surface of the power supply unit 10, and is provided in a state where at least a part thereof is exposed to the outside of the aerosol inhaler 1 (see "exposed" for "exposed to outside" corresponding to the display in FIG. 6). Therefore, the display 16 may generate noise that is due to static electricity generated when the display 16 is in contact with any object (for example, the hand of the user) outside the aerosol inhaler 1 (see "static electricity" for "type of noise" corresponding to the display in FIG. 6).

The display 16 is provided in a state of being provided in the power supply unit 10, and is basically not attached to or detached from the power supply unit 10 (see "provided" for "connection to main body" corresponding to the display in FIG. 6). Therefore, the display 16 does not generate noise (ESD) that is due to static electricity or a surge generated when the display 16 is attached to or detached from the power supply unit 10.

The display 16 does not generate the counter-electromotive force even when the display 16 operates. That is, the display 16 may not become a noise source that generates noise by itself (see "absence" for "presence or absence of possibility of becoming noise source" corresponding to the display in FIG. 6).

For the display 16 having such characteristics as a load, since it is necessary to step down high-voltage static electricity, by providing the variable resistors VR5 and VR6 having a large allowable current (see "variable resistor" for "overvoltage protection element" corresponding to the display in FIG. 6), it is possible to appropriately protect the system of the aerosol inhaler 1 (the power supply unit 10) from an overvoltage that may occur due to the display 16. Further, a cost of the Zener diode tends to be higher than that of the variable resistor. Therefore, by adopting the variable resistor as the protection element, it is also possible to prevent a large number of Zener diodes and to prevent an increase in a manufacturing cost of the power supply unit 10.

The first cartridge 20 is basically housed in the cartridge holder 14, and is provided in a state of not being exposed to the outside of the aerosol inhaler 1 (see "not exposed" for "exposed to outside" corresponding to the first cartridge in FIG. 6). Therefore, the first cartridge 20 does not generate noise that is due to static electricity generated when the first cartridge 20 is in contact with any object outside the aerosol inhaler 1.

The first cartridge 20 is provided in a state of being attachable to and detachable from the power supply unit 10, and can be attached to and detached from the power supply unit 10 (see "attachable and detachable" for "connection to main body" corresponding to the first cartridge in FIG. 6). Therefore, the first cartridge 20 may generate noise (ESD) that is due to static electricity or a surge generated when the first cartridge 20 is attached to or detached from the power supply unit 10 (see "static electricity" for "type of noise" corresponding to the first cartridge in FIG. 6).

The first cartridge 20 does not generate the counter-electromotive force even when the first cartridge 20 is operated. That is, the first cartridge 20 may not become a noise source that generates noise by itself (see "absence" for "presence or absence of possibility of becoming noise source" corresponding to the first cartridge in FIG. 6).

Similar to the display 16, for the first cartridge 20 having such characteristics as a load, since it is necessary to step down high-voltage static electricity, by providing the variable resistor VR4 having a large allowable current (see "variable resistor" for "overvoltage protection element" corresponding to the first cartridge in FIG. 6), it is possible to appropriately protect the system of the aerosol inhaler 1 (the power supply unit 10) from an overvoltage that may occur due to the first cartridge 20.

The LED 70 is disposed inside the power supply unit case 11, and is provided in a state of not being exposed to the outside of the aerosol inhaler 1 (see "not exposed" for "exposed to outside" corresponding to the LED in FIG. 6). Therefore, the LED 70 does not generate noise that is due to static electricity generated by friction against any object outside the aerosol inhaler 1.

The LED 70 is provided in a state of being provided in the power supply unit 10, and is basically not attached to or detached from the power supply unit 10 (see "provided" for "connection to main body" corresponding to the LED in FIG. 6). Therefore, the LED 70 does not generate noise (ESD) that is due to static electricity or a surge generated when the LED 70 is attached to or detached from the power supply unit 10.

The LED 70 does not generate the counter-electromotive force even when the LED 70 is operated. That is, the LED 70 may not become a noise source that generates noise by itself (see "absence" for "presence or absence of possibility of becoming noise source" corresponding to the LED in FIG. 6).

In the LED 70 having such characteristics as a load, an overvoltage is less likely to occur. Therefore, a manufacturing cost of the aerosol inhaler 1 can be reduced by not providing the LED 70 with a Zener diode or a variable resistor for a purpose of protecting the LED 70 from the overvoltage and the like caused by the LED 70.

The intake sensor 15 also has characteristics as a load similar to that of the LED 70. Therefore, the manufacturing cost of the aerosol inhaler 1 can be reduced by not providing the intake sensor 15 with a Zener diode or a variable resistor for a purpose of protecting the intake sensor 15 from an overvoltage and the like caused by the intake sensor 15.

As described above, according to the power supply unit 10 of the present embodiment, the system of the aerosol inhaler 1 (the power supply unit 10) can be appropriately protected by providing overvoltage protection elements according to the characteristics (types) of the loads.

The present invention is not limited to the above-described embodiment, and can be appropriately modified, improved, and the like.

At least the following matters are described in the present description.

Corresponding components in the above embodiment are shown in parentheses. However, the present invention is not limited thereto.

(1) A power supply unit (the power supply unit 10) for an aerosol generation device (the aerosol inhaler 1) including:

a power supply (the power supply 12) configured to supply power to a heater (the load 21) configured to heat an aerosol source;

a first connector (the positive electrode side terminal 47*a*) connected to a first load (the vibrator 47) configured to function by power supplied from the power supply;

a second connector (the positive electrode side discharging terminal 41*a*) configured to function by power supplied from the power supply and connected to a second load (the load 21) separate from the first load;

a Zener diode (the Zener diode D) connected between the first connector and the power supply; and a variable resistor (the variable resistor VR4) connected between the second connector and the power supply.

According to (1), since the protection elements provided for the loads can be made different according to the loads connected to the connectors, the power supply unit for the aerosol generation device including a plurality of loads can be appropriately protected.

(2) The power supply unit for the aerosol generation device according to (1), in which the first connector irremovably connects the first load, and in which the second connector removably connects the second load.

According to (2), since the variable resistor is provided as a protection element for the connector where static electricity may be generated by removing (that is, attaching or detaching) a load, the power supply unit for the aerosol generation device can be appropriately protected from the static electricity. Further, by adopting the variable resistor as the protection element, it is possible to prevent a large number of Zener diodes, which are likely to be expensive, and to prevent an increase in a manufacturing cost of the power supply unit.

(3) The power supply unit for the aerosol generation device according to (1) or (2), further including:

a case configured to house at least the power supply and the first connector, in which the first connector is connected to the first load not exposed from the case, and in which the second connector is connected to the second load at least partially exposed from the case.

According to (3), since the variable resistor is provided as the protection element for the connector where static electricity may be generated by, for example, being in contact with any object (for example, a hand of a user) outside the case due to at least a part being exposed from the case, the power supply unit for the aerosol generation device can be appropriately protected from the static electricity.

(4) The power supply unit for the aerosol generation device according to any one of (1) to (3), in which the first load vibrates while functioning, and in which the second load does not vibrate while functioning.

According to (4), since the Zener diode is provided as the protection element for a load that is a noise source itself to generate vibration, it is possible to appropriately protect the power supply unit for the aerosol generation device from noise generated by the load that is the noise source.

(5) The power supply unit for the aerosol generation device according to any one of (2) to (4), further including:
    a voltage converter connected to the second connector and configured to convert a voltage of power supplied from the power supply,
    in which the variable resistor is connected between the second connector and the voltage converter.

According to (5), since the voltage converter is provided behind the variable resistor as a protection element on an entrance path of static electricity, even when the variable resistor fails, the voltage converter can serve as a barrier against noise (the static electricity) for other elements behind the variable resistor and the voltage converter and can protect other elements.

(6) The power supply unit for the aerosol generation device according to any one of (1) to (5), further including:
    a first capacitor (the capacitor CD9) connected between the first connector and the Zener diode; and
    a second capacitor (the capacitor CD10) connected between the power supply and the variable resistor.

According to (6), by providing the capacitors respectively between the first connector and the Zener diode and between the power supply and the variable resistor, the capacitors can be provided at appropriate positions, and the power supply unit for the aerosol generation device can be appropriately protected.

(7) The power supply unit for the aerosol generation device according to any one of (1) to (6), further including:
    a third connector (the connector 70*a*) that is configured to function by power supplied from the power supply and to which a third load (the LED 70) separate from the first load and the second load is connected,
    in which a path configured to connect the third connector and the power supply does not include a Zener diode and a variable resistor.

According to (7), by not providing the Zener diode and the variable resistor in the path that connects the third connector and the power supply, it is possible to prevent an increase in the manufacturing cost of the power supply unit and enlargement of an electric circuit.

(8) The power supply unit for the aerosol generation device according to (7),
    in which the path does not include a voltage converter configured to convert a voltage of power supplied from the power supply.

According to (8), by not providing the voltage converter in the path that connects the third connector and the power supply, it is possible to prevent the increase in the manufacturing cost of the power supply unit and the enlargement of the electric circuit.

(9) The power supply unit for the aerosol generation device according to (8),
    in which the path includes a resistance (the resistor R8) connected in series with the power supply and the third connector.

According to (9), by providing the resistance connected in series with the power supply and the third connector in the path that connects the third connector and the power supply, it is possible to supply appropriate power to the third load with a simple configuration, and it is possible to implement increased functionality of the aerosol generation device while preventing the increase in the manufacturing cost of the power supply unit and the enlargement of the electric circuit.

(10) The power supply unit for the aerosol generation device according to any one of (7) to (9), further including:
    a controller (the MCU 50) configured to control a supply of power from the power supply to the first connector, the second connector, and the third connector,
    in which the controller controls power supplied to the third connector to be smaller than power supplied to the first connector, and
    in which the controller controls power supplied to the third connector to be smaller than power supplied to the second connector.

According to (10), since the power supplied to the third connector can be limited more than the power supplied to other connectors, it is possible to supply appropriate power to the third load with the simple configuration, and it is possible to implement the increased functionality of the aerosol generation device while preventing the increase in the manufacturing cost of the power supply unit and the enlargement of the electric circuit.

What is claimed is:

1. A power supply unit for an aerosol generation device comprising:
    a power supply configured to supply power to a heater configured to heat an aerosol source;
    a first connector connected to a first load configured to function by power supplied from the power supply;
    a second connector configured to function by power supplied from the power supply and connected to a second load separate from the first load;
    a Zener diode connected between the first connector and the power supply; and
    a variable resistor connected between the second connector and the power supply,
    wherein the first connector irremovably connects the first load, and
    wherein the second connector removably connects the second load.

2. A power supply unit for an aerosol generation device comprising:
    a power supply configured to supply power to a heater configured to heat an aerosol source;
    a first connector connected to a first load configured to function by power supplied from the power supply;
    a second connector configured to function by power supplied from the power supply and connected to a second load separate from the first load;
    a Zener diode connected between the first connector and the power supply;
    a variable resistor connected between the second connector and the power supply; and
    a case configured to house at least the power supply and the first connector,
    wherein the first connector is connected to the first load not exposed from the case, and
    wherein the second connector is connected to the second load at least partially exposed from the case.

3. A power supply unit for an aerosol generation device comprising:
    a power supply configured to supply power to a heater configured to heat an aerosol source;
    a first connector connected to a first load configured to function by power supplied from the power supply;
    a second connector configured to function by power supplied from the power supply and connected to a second load separate from the first load;
    a Zener diode connected between the first connector and the power supply; and a variable resistor connected between the second connector and the power supply wherein the first load is a vibrator vibrating while functioning, and wherein the second load does not vibrate while functioning.

4. The power supply unit for the aerosol generation device according to claim 2, wherein the first connector irremovably connects the first load, and wherein the second connector removably connects the second load.

5. The power supply unit for the aerosol generation device according to claim 3, wherein the first connector irremovably connects the first load, and wherein the second connector removably connects the second load.

6. The power supply unit for the aerosol generation device according to claim 2, further comprising:

a voltage converter connected to the second connector and configured to convert a voltage of power supplied from the power supply, wherein the variable resistor is connected between the second connector and the voltage converter.

7. The power supply unit for the aerosol generation device according to claim 3, further comprising:

a voltage converter connected to the second connector and configured to convert a voltage of power supplied from the power supply, wherein the variable resistor is connected between the second connector and the voltage converter.

8. The power supply unit for the aerosol generation device according to claim 1, further comprising:

a first capacitor connected between the first connector and the Zener diode; and a second capacitor connected between the power supply and the variable resistor.

9. The power supply unit for the aerosol generation device according to claim 2, further comprising:

a first capacitor connected between the first connector and the Zener diode; and a second capacitor connected between the power supply and the variable resistor.

10. The power supply unit for the aerosol generation device according to claim 3, further comprising:

a first capacitor connected between the first connector and the Zener diode; and a second capacitor connected between the power supply and the variable resistor.

11. The power supply unit for the aerosol generation device according to claim 1, further comprising:

a third connector that is configured to function by power supplied from the power supply and to which a third load separate from the first load and the second load is connected, wherein a path configured to connect the third connector and the power supply does not include a Zener diode and a variable resistor.

12. The power supply unit for the aerosol generation device according to claim 2, further comprising:

a third connector that is configured to function by power supplied from the power supply and to which a third load separate from the first load and the second load is connected, wherein a path configured to connect the third connector and the power supply does not include a Zener diode and a variable resistor.

13. The power supply unit for the aerosol generation device according to claim 3, further comprising:

a third connector that is configured to function by power supplied from the power supply and to which a third load separate from the first load and the second load is connected, wherein a path configured to connect the third connector and the power supply does not include a Zener diode and a variable resistor.

14. The power supply unit for the aerosol generation device according to claim 11, wherein the path does not include a voltage converter configured to convert a voltage of power supplied from the power supply.

15. The power supply unit for the aerosol generation device according to claim 12, wherein the path does not include a voltage converter configured to convert a voltage of power supplied from the power supply.

16. The power supply unit for the aerosol generation device according to claim 13, wherein the path does not include a voltage converter configured to convert a voltage of power supplied from the power supply.

17. The power supply unit for the aerosol generation device according to claim 14, wherein the path includes a resistance connected in series with the power supply and the third connector.

18. The power supply unit for the aerosol generation device according to claim 11, further comprising:

a controller configured to control a supply of power from the power supply to the first connector, the second connector, and the third connector, wherein the controller controls power supplied to the third connector to be smaller than power supplied to the first connector, and wherein the controller controls power supplied to the third connector to be smaller than power supplied to the second connector.

19. The power supply unit for the aerosol generation device according to claim 12, further comprising:

a controller configured to control a supply of power from the power supply to the first connector, the second connector, and the third connector, wherein the controller controls power supplied to the third connector to be smaller than power supplied to the first connector, and wherein the controller controls power supplied to the third connector to be smaller than power supplied to the second connector.

20. The power supply unit for the aerosol generation device according to claim 13, further comprising:

a controller configured to control a supply of power from the power supply to the first connector, the second connector, and the third connector, wherein the controller controls power supplied to the third connector to be smaller than power supplied to the first connector, and wherein the controller controls power supplied to the third connector to be smaller than power supplied to the second connector.

* * * * *